(12) United States Patent
Tauber et al.

(10) Patent No.: US 11,635,244 B2
(45) Date of Patent: Apr. 25, 2023

(54) CRYOCOOLER CONTROLLER SYSTEMS AND METHODS

(71) Applicant: Teledyne FLIR Commercial Systems, Inc., Goleta, CA (US)

(72) Inventors: Sean Tauber, Goleta, CA (US); Tadashi Horikiri, Santa Barbara, CA (US); Jeff R. Becker, Goleta, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 166 days.

(21) Appl. No.: 16/824,590

(22) Filed: Mar. 19, 2020

(65) Prior Publication Data

US 2020/0217568 A1    Jul. 9, 2020

Related U.S. Application Data

(63) Continuation of application No. PCT/US2018/055295, filed on Oct. 10, 2018.
(Continued)

(51) Int. Cl.
| F25B 9/14 | (2006.01) |
| F25B 49/02 | (2006.01) |
| G01J 5/061 | (2022.01) |

(52) U.S. Cl.
CPC .............. *F25B 49/022* (2013.01); *F25B 9/14* (2013.01); *G01J 5/061* (2013.01); *F25B 2309/1428* (2013.01)

(58) Field of Classification Search
CPC .. F25B 49/022; F25B 9/14; F25B 2309/1428; G01J 5/061
See application file for complete search history.

(56) References Cited

U.S. PATENT DOCUMENTS

| 5,032,772 A | 7/1991 | Gully et al. |
| 5,156,005 A | 10/1992 | Redlich |

(Continued)

FOREIGN PATENT DOCUMENTS

| CN | 1103928 | 6/1995 |
| CN | 101825368 | 9/2010 |

(Continued)

OTHER PUBLICATIONS

3. Chinese Office Action dated Jun. 30, 2021 in Chinese Patent Application 201880066383.9.
(Continued)

*Primary Examiner* — Nael N Babaa
(74) *Attorney, Agent, or Firm* — Haynes and Boone, LLP

(57) ABSTRACT

Techniques are disclosed for systems and methods to control operation of a cryocooler/refrigeration system to provide cryogenic and/or general cooling of a device or sensor system. A cryocooler controller includes a motor driver controller configured to generate motor driver control signals based on operational parameters corresponding to operation of a cryocooler controlled by the controller, and a motor driver configured to generate corresponding drive signals to drive a motor of the cryocooler. The motor driver includes a first stage with a first pair of switches coupled serially between an input of the motor driver and a ground of the motor driver, a second pair of switches coupled serially between an output of the first stage and the ground of the motor driver, and an inductor coupled between the first and second pairs of switches, where operation of each switch is independently controlled by the motor driver control signals.

20 Claims, 13 Drawing Sheets

Related U.S. Application Data

(60) Provisional application No. 62/738,950, filed on Sep. 28, 2018, provisional application No. 62/571,000, filed on Oct. 11, 2017.

(56) References Cited

U.S. PATENT DOCUMENTS

| | | |
|---|---|---|
| 5,412,951 A | 5/1995 | Wu |
| 5,457,956 A | 10/1995 | Bowman et al. |
| 5,813,235 A | 9/1998 | Peterson |
| 6,131,394 A | 10/2000 | Lavietes et al. |
| 6,198,257 B1 | 3/2001 | Belehradek et al. |
| 6,272,866 B1 | 8/2001 | Tsai et al. |
| 6,385,973 B1 | 5/2002 | Moran |
| 6,424,276 B1 | 7/2002 | Muñoz et al. |
| 7,333,349 B2 | 2/2008 | Chang et al. |
| 7,555,908 B2 | 7/2009 | Bin-Nun |
| 7,614,240 B2 | 11/2009 | Rampersad |
| 8,378,656 B2 | 2/2013 | de Rooij et al. |
| 8,794,016 B2 | 8/2014 | Ogden et al. |
| 8,959,929 B2 | 2/2015 | Bin-Nun |
| 8,970,158 B1 | 3/2015 | Chowning |
| 2005/0000233 A1 | 1/2006 | Hao et al. |
| 2007/0261416 A1 | 11/2007 | Harvey et al. |
| 2008/0282706 A1 | 11/2008 | Hon et al. |
| 2009/0056330 A1 | 3/2009 | Formosa |
| 2012/0228938 A1 | 9/2012 | Thieringer et al. |
| 2016/0359415 A1 | 12/2016 | Friebe et al. |

FOREIGN PATENT DOCUMENTS

| | | |
|---|---|---|
| CN | 102245887 | 11/2011 |
| CN | 203321781 | 12/2013 |
| CN | 104390383 | 3/2015 |
| CN | 205025754 | 2/2016 |
| CN | 106233081 | 12/2016 |
| CN | 107143969 A | 9/2017 |
| EP | 0778 508 A2 | 6/1997 |
| EP | 0778508 | 6/1997 |
| WO | WO 2019/010202 | 7/2018 |
| WO | WO 2019/075122 | 4/2019 |

OTHER PUBLICATIONS

Barton, Paul H. et al., "Stirling Cryocooler Prognostics and Health Management (PHM)", Autotestcon, 2009 IEEE, pp. 78-81.

Cobham Mission System—Life Support Systems (now Eaton Business System)—CC1071 Cryocooler Controller, Digital, CC1072 Cryocooler Controller, Universal, CC1074 Cryocooler Controller, Digital and CC1077 MicroController, 2013.

Guo, Dongzhi et al., Modeling System Dynamics in a MEMS-Based Stirling Cooler, Proceedings of the 2011 COMSOL Conference in Boston, 4 pages.

Nanohmics, Inc., SBIR Project: High Efficiency MEMS Based Cryocooler, NASA 02-II E1.07-9079. <URL: https://www.sbir.gov/sbirsearch/detail/243107>.

Patterson, D.E., et al., CVD Diamond Based Miniature Stirling Cooler, Cryocoolers 14, International Cryocooler Conference, Inc. Boulder, CO, 2007, pp. 95-104.

Sobol, S. et al., Development of a Linear Compressor for Stirling-Type Cryocoolers Activated by Piezoelectric Elements in Resonance, Cryocoolers 17, International Cryocooler Conference, Inc. Boulder, CO, 2012, pp. 331-340.

Sobol, S. et al., Linear Resonance Compressor for Stirling-Type Cryocoolers Activated by Piezoelectric Stack-Type Elements, IOP Conf. Series: Materials Science and Engineering, vol. 101, 2015, 9 pages.

Thales Cryogenics—XPCDE 4865, HPCDE 2465, MPCDE 2450, and LPCDE 1220, Jan. 2016.

Yang et al., "A Novel Vibration Control System for Stirling Cryocoolers", SPIE, vol. 6835-6850E-1, XP040432160, Jan. 1, 2008, 11 pages.

CRYOCOOLER CONTROLLER SYSTEMS AND METHODS

CROSS-REFERENCE TO RELATED APPLICATIONS

This application is a continuation of International Patent Application No. PCT/US2018/055295 filed Oct. 10, 2018 and entitled "CRYOCOOLER CONTROLLER SYSTEMS AND METHODS," which is incorporated herein by reference in its entirety.

International Patent Application No. PCT/US2018/055295 filed Oct. 10, 2018 claims priority to and the benefit of U.S. Provisional Application No. 62/571,000 filed Oct. 11, 2017, entitled "CRYOCOOLER CONTROLLER SYSTEMS AND METHODS," and U.S. Provisional Application No. 62/738,950 filed Sep. 28, 2018, entitled "CRYOCOOLER CONTROLLER SYSTEMS AND METHODS," both of which are hereby incorporated by reference in their entireties.

TECHNICAL FIELD

One or more embodiments of the invention relate generally to cryogenic refrigeration devices and more particularly, for example, to controllers for refrigeration systems and methods.

BACKGROUND

Cryogenic refrigeration systems, or cryocoolers, are typically used to cool other devices to temperatures approaching or below approximately 120 Kelvin, and, more generally, can be used to cool devices to between 200 and 60 Kelvin, for example, depending on the overall heat load presented by a particular device. Such cooled devices are often one of a variety of different types of sensor systems that operate better (e.g., produce measurements with less noise, higher sensitivity, higher accuracy, higher responsiveness, and/or with other generally more desirable performance metrics) when cooled. For example, one such category of sensor systems that can benefit from being cooled includes infrared cameras (e.g., including a focal plane array (FPA) of individual infrared sensors), which measure or capture infrared (e.g., thermal) emissions from objects as infrared/thermal images and/or video. Cooling such infrared cameras generally increases detector sensitivity (e.g., by decreasing thermal noise intrinsic to the individual infrared sensors), which can result in overall more accurate and reliable infrared imagery.

Cryocoolers for use with infrared cameras can be quite small (e.g., designed to fit within a volume of approximately 3×3×2 inches, or less), yet be able to provide sufficient cooling power (e.g., a measure, typically in Watts, of a refrigerator's ability to extract heat from a coupled device) to cool at least portions of an infrared camera to the range of temperatures desired for, for example, relatively low noise thermal imagery, while experiencing the thermal load typical of an operating infrared camera. Waste heat generated by system electronics, such as a controller for the cryocooler (e.g., a device configured to power and operate the cryocooler according to a desired temperature and/or other operating parameters) can have substantial negative impact on the weight, cost, and overall performance of the cryocooler and/or sensor system. Moreover, reductions in system size and weight, and increases in electrical efficiency, can be helpful to facilitate various low power, size, and weight applications, including integration with a flight platform.

Thus, there is a need in the art for a relatively compact and efficient cryocooler controller that is able to maintain or increase overall system performance relative to conventional controllers.

SUMMARY

Techniques are disclosed for systems and methods to control operation of a cryocooler/refrigeration system to provide cryogenic and/or general cooling of a device or sensor system.

In one embodiment, a system may include a motor driver controller configured to receive operational parameters corresponding to operation of a cryocooler controlled by the cryocooler controller and generate motor driver control signals based, at least in part, on the received operational parameters. The system may also include a motor driver configured to receive the motor driver control signals from the motor driver controller and generate drive signals based, at least in part, on the motor driver control signals, to drive a motor of the cryocooler. The motor driver may include a first stage including or consisting of a first pair of switches coupled serially between an input of the motor driver and a ground of the motor driver, a second pair of switches coupled serially between an output of the first stage and the ground of the motor driver, and an inductor coupled between the first and second pairs of switches, where operation of each switch of the first and second pairs of switches is independently controlled by the motor driver control signals generated by the motor driver controller.

In another embodiment, a method may include receiving operational parameters corresponding to operation of a cryocooler controlled by a cryocooler controller, generating motor driver control signals based, at least in part, on the received operational parameters, receiving, by a motor driver of the cryocooler controller, the motor driver control signals, and generating, by the motor driver of the cryocooler controller, drive signals to drive a motor of the cryocooler. The motor driver may include a first stage comprising or consisting of a first pair of switches coupled serially between an input of the motor driver and a ground of the motor driver, a second pair of switches coupled serially between an output of the first stage and the ground of the motor driver, and an inductor coupled between the first and second pairs of switches, where operation of each switch of the first and second pairs of switches is independently controlled by the motor driver control signals generated by the motor driver controller.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
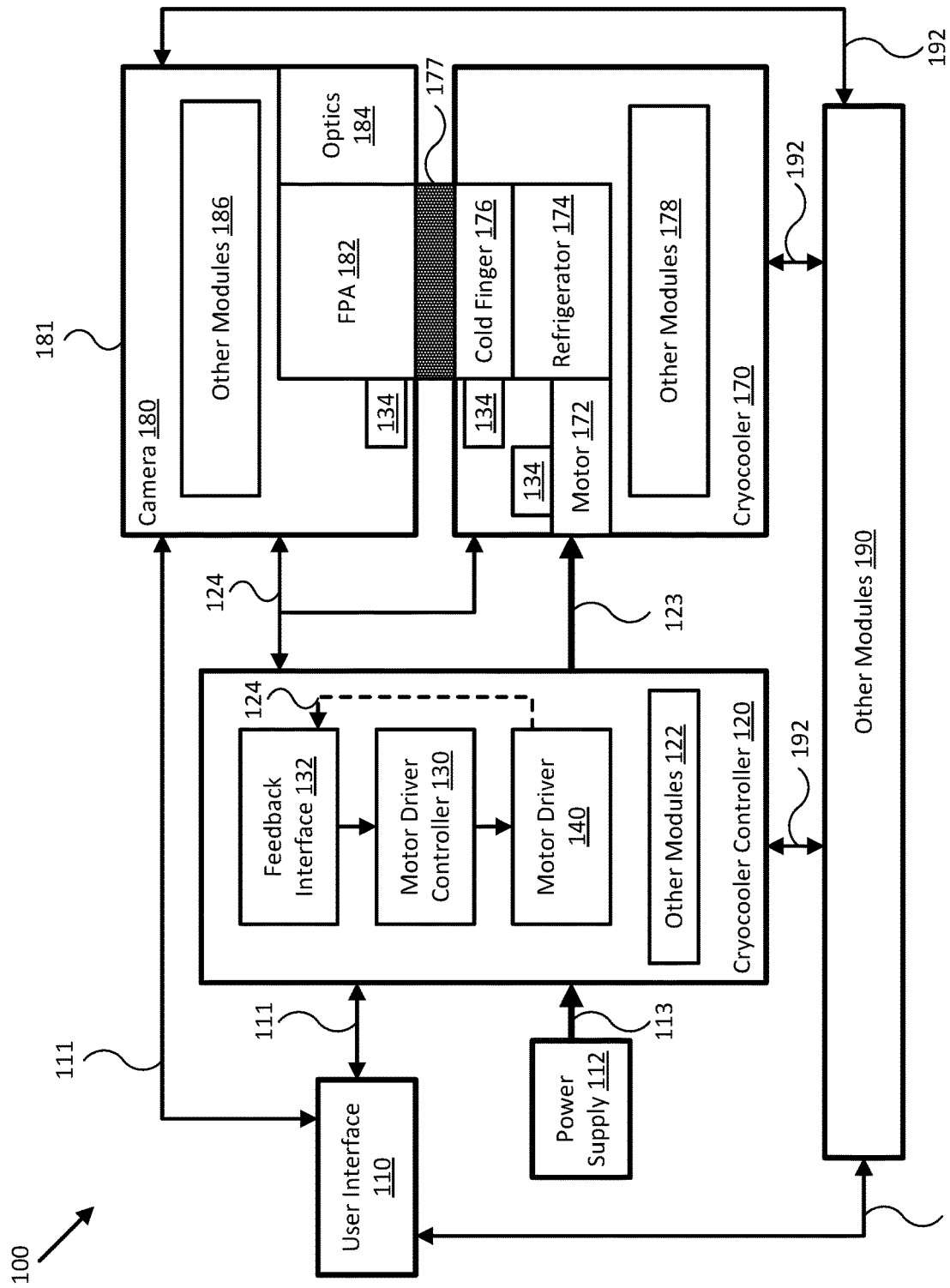
FIG. 1 illustrates a block diagram of a refrigeration system including a cryocooler controller in accordance with an embodiment of the disclosure.

In accordance with various embodiments of the present disclosure, compact and powerful refrigeration systems and methods may advantageously employ an efficient and flexible cryocooler controller that includes a low power but highly flexible and feature-rich motor driver controller and a robust motor driver design that can be implemented with few electrical components yet generate a relatively clean/noise-free and configurable/variable drive signal for driving a motor for the refrigeration system. For example, the motor driver for the cryocooler controller may be implemented by a buck-boost inverter stage including only four switches and an inductor and a commutator stage including only an additional four switches. The motor driver controller can control operation of the 8 total switches to produce an alternating current (AC) output signal with a configurable/variable frequency, amplitude, and/or other waveform characteristics, for example, and the drive signal produced by the motor driver can be generated with a voltage amplitude exceeding the input voltage level of a direct current (DC) input power signal provided to the motor driver. The buck-boost inverter stage may additionally include a single capacitor that, with the inductor, form a single low pass filter that is integrated with the buck-boost inverter stage and that substantially eliminates switching and/or other system noise from the AC output signal generated by the motor driver.

By limiting the number of components in the motor driver, embodiments of the cooler controller can be configured to produce driver signals at a device efficiency (e.g., defined as the rms output power delivered to the motor for the refrigeration system divided by the rms input power provided to all the elements of the cryocooler controller) greater than approximately 95-96% across the full range of power supplied to the motor for the refrigeration system. Conventional controllers typically only reach efficiencies approaching 90% or worse and, moreover are typically relatively noisy (e.g., by allowing unfiltered switching noise to reach the motor for the refrigeration system).

Such relatively high efficiencies allows embodiments to operate with minimal waste heat, which in turn allows such embodiments to be packaged more compactly and less expensively within or about the refrigeration system, for example, without negatively affecting the cooling performance of the refrigeration system. In addition, the increased efficiency and flexibility of the cryocooler controller can help constituent refrigeration systems reach higher cooling powers (and lower achievable operating temperatures) than similarly sized conventional systems, particularly when operated at similar input power. Moreover, the reduced number of components allows embodiments to be implemented within relatively small size constraints, which in turn allow further reduction of the overall size and weight of the refrigeration system.

Because embodiments of the present disclosure produce relatively noise-free motor drive signals and can provide relatively high cooling powers and low operating temperatures, coupled cooled sensor systems can operate according to higher performance characteristics than achievable with conventional refrigeration systems, particularly where compactness and efficiency are at a premium, such as in applications involving spaceflight, unmanned aircraft systems, relatively large and/or high power-dissipating sensor systems, and/or battery or solar powered systems. In particular, higher cooling powers and/or lower operating temperatures can increase general performance in the operation of infrared cameras.

For example, infrared cameras may be used for nighttime or other applications when ambient lighting is poor or when environmental conditions are otherwise non-conducive to visible spectrum imaging, and they may also be used for applications in which additional non-visible-spectrum information about a scene is desired, such as for gas leak detection. In each application, it is typically desirable to reduce noise and variability in images captured by the infrared camera by cooling at least a focal plane array (FPA) of the infrared camera to a cryogenic and/or relatively stable temperature while the images are captured. It is also typically desirable to minimize system noise and/or other extrinsic signals that can cause heating and/or interference with operation of the infrared camera. The higher cooling powers provided by embodiments of the present disclosure can cool larger and/or more power dissipative FPAs (e.g., higher performance FPAs), for example, and/or can provide lower and more stable operating temperatures; lower operating temperatures result in lower noise in resulting infrared imagery, and more stable operating temperatures result in more reliable and accurate infrared images (e.g., in particular, thermal images).

FIG. 1 illustrates a block diagram of a refrigeration system 100 including a cryocooler controller 120 in accordance with an embodiment of the disclosure. As shown in FIG. 1, refrigeration system 100 includes power supply 112 providing an input power signal over power leads 113 to cooler controller 120, which then provides motor drive signals over power leads 123 to drive motor 172 of cryocooler 170. In general, cryocooler 170 operates to cool cold finger 176, which is thermally coupled to and configured to cool/extract heat from at least a portion (e.g., FPA 182) of electronic device/sensor/camera 180 through thermal interface 177. As shown in FIG. 1, cryocooler controller 120 may be configured to receive various sensor signals (e.g., corresponding to an input voltage of the input power signal provided by power supply 112, an output voltage of motor drive signals generated by motor driver 140/cryocooler controller 120, temperatures of various components of refrigeration system 100 measured by temperature sensors 134, and/or other sensor signals corresponding to operation of cryocooler 170 and/or other elements of refrigeration system 100) as feedback of operation of cryocooler 170 and/or other elements of refrigeration system 100, and to adjust drive signals provided to motor 172 accordingly (e.g., so as provide a stable and/or desired temperature and/or cooling power at cold finger 176).

Also shown in FIG. 1 is user interface 110. User interface 110 may be implemented as a personal computer, a tablet, a smart phone, a mobile computing device and/or vehicle interface, and/or one or more of a display, a touch screen, a keyboard, a mouse, a joystick, a knob, button, or switch, and/or any other device capable of accepting user input and/or providing feedback to a user. More generally, user interface 110 may be configured to provide user-level control of refrigeration system 100 and to provide operational feedback to a user of system 100.

User interface 110 may be integrated with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of system 100. In addition, user interface 110 may include a machine readable medium provided for storing non-transitory instructions for loading into and execution by user interface 110. In these and other embodiments, user interface 110 may be implemented with other components where appropriate, such as volatile memory, non-volatile memory, and/or various analog and/or digital components for interfacing with devices of system 100.

In various embodiments, user interface 110 may be configured to provide an initialization signal to cryocooler controller 120 to begin operation of cryocooler 170, for example, or to provide a temperature set point and/or other operational parameters (e.g., corresponding to a desired operational state of cryocooler 170) to cryocooler controller 120. In specific embodiments, user interface 110 may be configured to provide and/or update configuration data, including logic-level configuration data, to cryocooler controller 120 to facilitate control of operation of cryocooler 170, as described herein. User interface 110 may also be configured to receive an operating temperature, power draw, efficiency, and/or other operating characteristic and/or measured feedback of operation of cryocooler 170 and/or other elements of refrigeration system 100 (e.g., from cryocooler controller 120 and/or other elements of system 100) and provide such information for display or indication to a user. In some embodiments, user interface 110 may be configured to receive infrared images captured by camera 180 (e.g., over data leads 111) and provide the infrared images for display to a user.

Power supply 112 may be implemented as a battery, solar cell, mechanical generator, and/or other power generating and/or delivery device, which may be provided specifically to power refrigeration system 100, for example, and/or be coupled to, integrated with, or generated as part of the operation of a separate platform, such as a sensor, vehicle, aircraft, watercraft, or other fixed or mobile platform. In some embodiments, power supply 112 may be configured to provide an input DC power signal over power leads 113, such as a 12V, 40V, 48V, or other voltage level DC power signal. More generally, power supply 112 may be configured to provide any type of input power signal over power leads 113 that can be converted by cryocooler controller 120 into motor drive signals appropriate to drive motor 172.

As shown in FIG. 1, cryocooler controller 120 includes motor driver controller 130, feedback interface 132, motor driver 140, and optional other modules 122. In additional embodiments, such as where cryocooler 170 includes multiple motors, cryocooler controller 120 may be implemented with multiple motor drivers, for example, that may each be controlled independently by motor driver control signals generated by motor driver controller 130.

Motor driver controller 130 may be implemented as any appropriate logic device (e.g., processing device, microcontroller, processor, ASIC, FPGA, memory storage device, memory reader, or other device or combinations of devices) that may be adapted to execute, store, and/or receive appropriate instructions, such as software instructions implementing a control loop for controlling various operations of cryocooler 170 and/or other components of system 100. For example, motor driver controller 130 may be configured to receive operational parameters corresponding to operation of cryocooler 170 and generate motor driver control signals configured to control operation of motor driver 140 based, at least in part, on the received operational parameters.

In addition, motor driver controller 130 may include a machine readable medium provided for storing data and/or non-transitory instructions for loading into and execution by motor driver controller 130. In these and other embodiments, motor driver controller 130 may be implemented with other components where appropriate, such as volatile memory, non-volatile memory, and/or various analog and/or digital components for interfacing with devices of system 100. In a particular embodiment, motor driver controller 130 may be implemented substantially entirely by a programmable logic device (PLD), such as an FPGA, which may be configured to implement (e.g., using programmable resources) and perform any of the methods described herein. In such embodiments, user interface 110 may be configured to provide/update configuration data over data leads 111 to motor driver controller 130 that is configured to implement/update/modify such methods in programmable resources and/or other elements of motor driver controller 130. Various embodiments of motor driver controller 130 are described in more detail with reference to FIGS. 7-9.

Motor driver 140 may be implemented by one or more electrical components, such as various electrically controllable switches/transistors, an inductor, and a capacitor, that are configured to receive motor driver control signals from the motor driver controller and to generate drive signals based, at least in part, on the motor driver control signals, to drive motor 172 of cryocooler 170. An embodiment of motor driver 140 is described in more detail with reference to FIG. 3.

Feedback interface 132 may be implemented by one or more of a multichannel analog to digital converter, a reference signal source, a temperature sensor, a digital communication interface, and/or other electrical or electronic components configured to receive and/or measure sensor signals corresponding to operation of cryocooler 170 and/or other elements of system 100 (e.g., over sensor leads 124) and convert such sensor signals into corresponding feedback data indicative of an operational state of cryocooler 170 and/or other elements of system 100. Feedback interface 132 may be configured to provide such feedback data to motor driver controller 130 to help adjust operation of cryocooler 170 and/or other elements of system 100 according to various desired operational characteristics or states of cryocooler 170 and/or other elements of system 100.

For example, feedback interface 132 may be configured to receive one or more sensor signals (e.g., from temperature sensor 134) and generate feedback data corresponding to operation of cryocooler 170, and motor driver controller 120 may be configured to receive the feedback data from feedback interface 132 and generate motor driver control signals based, at least in part, on the feedback data. In some embodiments, one or more of temperature sensors 134 may be implemented as diodes with characteristic voltage/temperature responses. Feedback interface 132 may be configured to provide a reference current to a diode and to measure/digitize the resulting voltage developed across the diode, which is proportional to the temperature of the temperature sensor 134. Advantageously, such diodes may be integrated with FPA 182 of camera 180, for example, allowing direct and precise measurement and feedback of a temperature of FPA 182.

In some embodiments, the one or more sensor signals received by feedback interface 132 may include a measured temperature of cold finger 176 of cryocooler 170 and/or electronic device 180 thermally coupled to cryocooler 170 (e.g., via thermal interface 177). Corresponding feedback data may be provided to motor driver controller 120, which may be configured to determine a feedback error based, at least in part, on a set point corresponding to a desired temperature for cold finger 176 and/or electronic device 180 and the received feedback data. In such embodiments, motor driver controller 120 may be configured to generate motor driver control signals based, at least in part, on the determined feedback error.

More generally, motor driver controller 120 may be configured to determine the feedback error, a ramp enable state corresponding to an operational state of cryocooler 170, and/or a ramp error based, at least in part, on feedback data (e.g., generated by feedback interface 132) corresponding to a measured temperature of cold finger 176 and/or electronic device 180, a measured input voltage of a power signal received by motor driver 140, a measured output voltage of drive signals generated by motor driver 140, and/or a measured temperature of cryocooler controller 120 (e.g., measured by feedback interface 132). In such embodiments, motor driver controller 120 may be configured to generate motor driver control signals based, at least in part, on the determined feedback error, ramp enable state, and/or ramp error. Optional other modules 122 may include various power, digital, and/or analog signal interfaces, sensors, and/or additional circuitry configured to facilitate operation of any element of cryocooler controller 120.

Cryocooler 170 may be implemented as any cooler or refrigeration system configured to convert electrical power delivered over power leads 123 to motor 172 into cooling power generated by refrigerator 174 at cold finger 176. In some embodiments, cryocooler 170 may be implemented as a Stirling refrigerator, for example, and in particular embodiments, as a miniature split-pair Stirling refrigerator, as described in more detail with reference to FIGS. 2A-B. As shown in FIG. 1, cryocooler 170 may include one or more temperature sensors 134 configured to provide sensor signals indicative of a measured temperature of a corresponding element of cryocooler 170 (e.g., of motor 172, for fault detection, or of cold finger 176, for operating temperature feedback) to feedback interface 132 of cryocooler controller 120. Optional other modules 178 may include additional temperature or electrical signal sensors, various mechanical or thermal linkages, dewar cavities, working fluid reservoirs, and/or other mechanical or electrical components or sensors configured to facilitate operation of any element of cryocooler 170 and/or provide additional operational feedback to cryocooler controller 120.

As shown in FIG. 1, cryocooler 170 may be thermally coupled to electronic device/sensor/camera 180 via thermal interface 177. For example, thermal interface 177 may be implemented by thermal grease, thermal tape, copper or aluminum plate or film, and/or other materials and/or structures configured to provide a reliable and highly thermally conductive link between cryocooler 170 and at least a portion of electronic device/sensor/camera 180. Electronic device/sensor/camera 180 may be any device, sensor, or imaging device that operates better (e.g., with higher signal to noise operational characteristics and/or with higher performance according to other performance metrics) when cooled.

For example, electronic device/camera 180 may include an infrared imaging sensor implemented as FPA 182, which may be coupled to optics 184 and be configured to image infrared radiation (e.g., including thermal radiation) emitted from a scene in view of optics 184. In some embodiments, cryocooler 170 may be directly coupled (e.g., via thermal interface 177) to a sensor (e.g., /FPA 182) of electronic device/camera 180 and primarily be configured to cool such sensor. In other embodiments, cryocooler 170 may be coupled to various elements of electronic device/camera 180 (e.g., optics 184, camera body 181, and/or other modules 186) and be configured to cool such various elements to help increase performance of electronic device/camera 180.

As shown in FIG. 1, electronic device/camera 180 may include one or more temperature sensors 134 configured to provide sensor signals indicative of a measured temperature of a corresponding element of electronic device/camera 180 (e.g., of FPA 182, for operating temperature feedback) to feedback interface 132 of cryocooler controller 120. Optional other modules 186 may include additional temperature or electrical signal sensors, FPAs of sensors sensitive to different spectrums (e.g., visible light), other optical elements, and/or other mechanical or electrical components or sensors configured to facilitate operation of any element of electronic device/camera 180 and/or provide additional operational feedback to cryocooler controller 120.

Also shown in FIG. 1 as optional are other modules 190 of system 100 coupled to user interface 120 over data leads 111 and to other elements of system 100 over leads 192. Other modules 190 may include additional sensors, additional temperature or electrical signal sensors, an actuated gimbal and associated control subsystem to aim electronic device/camera 180 according to a desired direction, an accelerometer, a compass, a global navigation satellite system receiver, a gyroscope, other orientation and/or position sensors, vibration sensors, thermal management subsystems, structural support, thermal and/or electrical shielding, and/or other mechanical or electrical components or sensors configured to facilitate operation of any element of refrigeration system 100 and/or provide additional operational feedback to cryocooler controller 120.

Figure 2A:
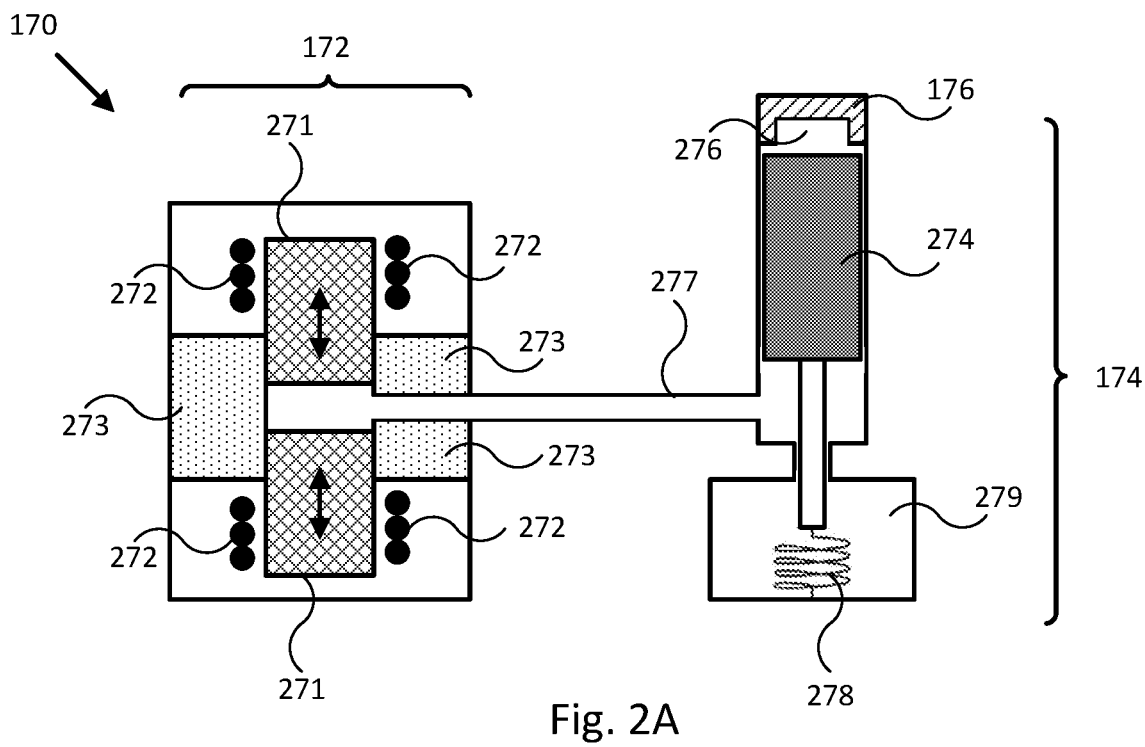
FIG. 2A illustrates a block diagram of a split-pair Stirling refrigerator/cryocooler that may be controlled by a cryocooler controller in accordance with an embodiment of the disclosure.

FIG. 2A illustrates a block diagram of a split-pair Stirling refrigerator/cryocooler 170 that may be controlled by cryocooler controller 120 of FIG. 1 in accordance with an embodiment of the disclosure. In the embodiment shown in FIG. 2A, cryocooler 170 includes motor/compressor 172 in fluid communication with refrigerator 174 via gas transfer line/tube 277. In general operation, motor/compressor 172 may be energized by motor driver 140 to compress working gas within the compression space (e.g., between pistons 271) and deliver a compression wave/mass flow of working gas through gas transfer line 277 to refrigerator 174. Heat in the working gas generated at least in part by the compression is extracted at the motor/compressor 172 and dissipated into the environment, rather than injected into refrigerator 174.

The compression wave/mass flow causes regenerator/displacer 274 to move towards cold finger 176 and extend spring 278 within bounce space 279, and at least a portion of the working gas travels through porous regenerator/displacer 274 and into expansion space 276. The restoring force provided by spring 278 and the draw-back of pistons 271 (as controlled by drive signals provided by motor driver 140) in between compression strokes draws regenerator/displacer 274 back towards bounce space 279 and expands the working gas within expansion space 276, thereby extracting heat from the environment through cold finger 176 and embedding it within the expanded working gas. Repeated operation of such cycle moves heat extracted from cold finger 176 (e.g., and anything thermally coupled to cold finger 176) to motor/compressor 172, and that transferred heat is dissipated into the environment (e.g., using various heat exchangers and thermal management coupled to motor/compressor 172), as is common with various Stirling cycle refrigeration systems.

As shown in FIG. 2A, motor/compressor 172 may be implemented with inductive windings 272 configured to cause pistons 271 to move towards each other to compress gas within the compression space therebetween. In some embodiments, motor driver 140 of cryocooler controller 120 may be electrically coupled to windings 272 of motor/compressor 172 (e.g., over power leads 123) and the motor drive signals generated by motor driver 140 may be used to drive pistons 271 to generate the compression wave/mass flow, as in a linear motor arrangement, as described herein. Other motor/compressor arrangements are contemplated, including various linear motor arrangements, other compressor arrangements, and/or cyclical motor and/or motor/compressor arrangements.

Figure 2B:
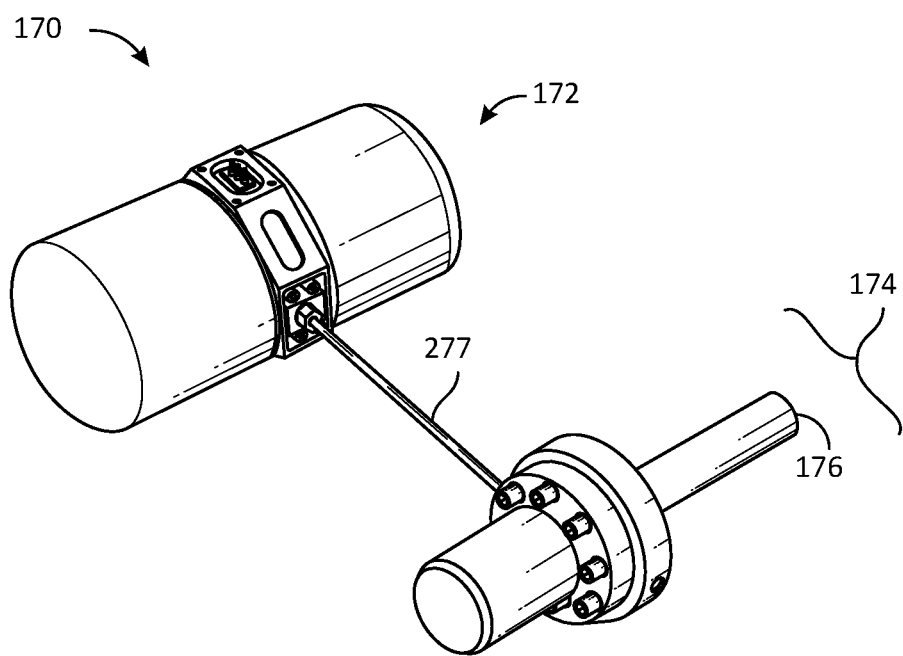
FIG. 2B illustrates an image of a split-pair Stirling refrigerator/cryocooler that may be controlled by a cryocooler controller in accordance with an embodiment of the disclosure.

FIG. 2B illustrates an image of a split-pair Stirling refrigerator/cryocooler 170 that may be controlled by cryocooler controller 120 of FIG. 1 in accordance with an embodiment of the disclosure. FIG. 2B illustrates the general size of a miniaturized cryocooler 170 that is analogous to cryocooler 170 of FIG. 2A and that may be used to cool FPA 182 of camera 180 in FIG. 1. For example, motor/compressor 172 may be approximately 2.6" in length, gas transfer line may be approximately the same length (e.g., or short or longer, depending on application needs), and refrigerator 174 may be approximately 2" in length with a cold finger diameter of approximately 0.5". In general, a cryocooler of a size and type similar to cryocooler 170 of FIG. 2B may be controlled by cryocooler controller 120 to reach stable operating temperatures, under typical head loads, of approximately 77K to 120K, or higher temperatures depending on the application needs. More generally, various cryocooler arrangements (e.g., including cryocooler arrangements including and/or different from a split-pair Stirling refrigerator arrangement) may be controlled by cryocooler controller 120 to reach a wide range of stable operating temperatures, cooling powers, and/or subject to a wide variety of different size, power, and weight constraints.

Figure 3:
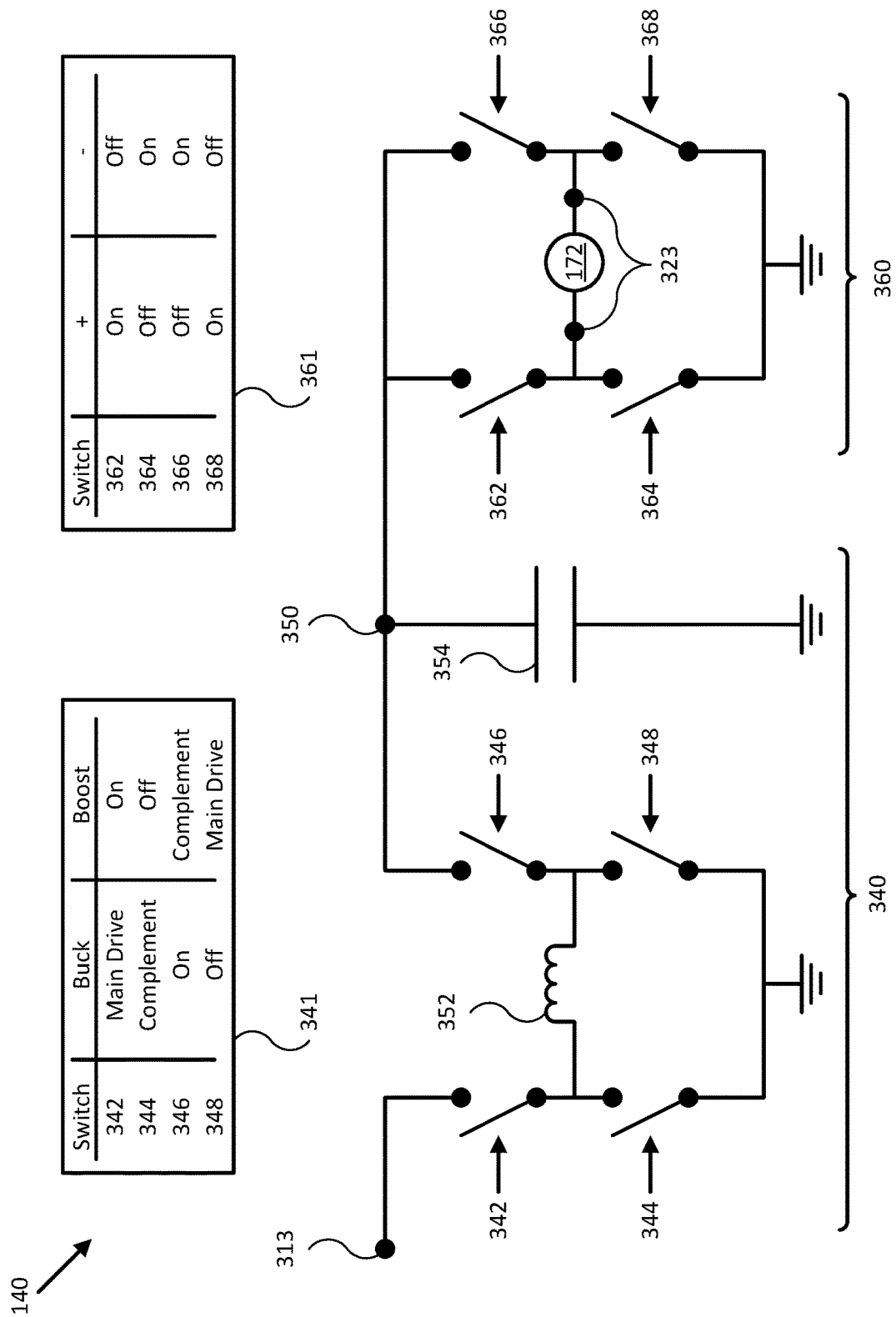
FIG. 3 illustrates a circuit diagram of a motor driver for a cryocooler controller in accordance with an embodiment of the disclosure.

FIG. 3 illustrates a circuit diagram of motor driver 140 for cryocooler controller 120 in accordance with an embodiment of the disclosure. For example, as shown in FIG. 3, motor driver 140 includes a first stage 340 that itself includes a first pair of switches 342 and 344 coupled serially between an input 313 of motor driver 140 and a ground of motor driver 140, a second pair of switches 346 and 348 coupled serially between an output 350 of the first stage and the ground of motor driver 140, and an inductor 352 coupled between the first and second pairs of switches, as shown. In general, first stage 340 may be referred to and/or operate as a buck-boost inverter stage, as described herein. Motor driver 140 of FIG. 3 also includes a second stage 360 coupled to output 350 of first stage 340 that itself includes a third pair of switches 362 and 364 and a fourth pair of switches 366 and 368 coupled serially between output 350 of first stage 340 and the ground of motor driver 140, as shown. A differential output 323 of motor driver 140 may be coupled between the third and fourth pairs of switches such that at least one switch 362-368 of the third and fourth pairs of switches is coupled between each lead of differential output 323 and output 350 of first stage 340 or the ground of the motor driver, as shown. In general, second stage 360 may be referred to and/or operate as a commutator stage, as described herein.

In general, operation of each switch 342-348 and 362-368 of the first, second, third, and fourth pairs of switches may be independently controlled by motor driver control signals generated by motor driver controller 130. In some embodiments, motor driver control signals (e.g., generated by motor driver controller 130) provided to switches 342-348 may be configured to cause first stage 340 to convert a DC power signal received at input 313 into a rectified sine wave drive signal generated at output 350. When configured in a buck-mode, as indicated by table 341, first stage 340 may generate output signals at output 350 with voltage levels up to approximately a voltage level Vin of an input power signal provided at input 313. For example, while in a buck-mode, the duty cycle of main drive switch 342 is proportional to the percentage of the input voltage Vin (e.g., provided at input 313) that is desired at output 350 (Vout). When configured in a boost-mode, as also indicated by table 341, first stage 340 may generate output signals at output 350 with voltage levels greater than approximately a voltage level of an input power signal provided at input 313. For example, while in a boost-mode, the duty cycle of main drive switch 348 may be equal to 1−Vin/Vout.

Motor driver control signals (e.g., also generated by motor driver controller 130) provided to switches 362-368 may be configured to cause second stage 360 to convert a rectified sine wave generated by first stage 340 at output 350 into a full sine wave motor drive signal generated at differential outputs 323 of motor driver 140. For example, table 361 indicates two switch configurations for switches 362-368 that are configured to select a polarity of differential output 323 relative to output 350 of first stage 340. In such embodiments, motor drive signals generated by motor driver 140 across differential output 323 include the full sine wave generated by second stage 360.

In various embodiments, each of switches 342-348 and 362-368 may be implemented by enhancement mode gallium nitride (GaN) field effect transistors (FETs) with very low parasitic properties and zero reverse recovery loss, which greatly reduces associated switching and conduction losses and improves electrical efficiency as measured across the entirety of cryocooler controller 120. For example, each switch may have an Rds(on) of approximately 15 mOhms and a gate capacitance low enough to allow switching frequencies substantially above any typical need when generating motor drive signals using an embodiment of motor driver 140. As an example, a typical PWM switching rate can be approximately 53 kHz in order to generate a relatively clean and pure (e.g., high resolution with little distortion) rectified sine wave with an intrinsic frequency less than approximately 200 Hz (e.g., or more typically between 60 and 100 Hz) and a switching frequency high enough to be effectively eliminated from the motor drive signals by a low pass filter integrated with first stage 340, as described herein. In addition, such FETs may be configured to accept 3.3V logic, which allows various types of PLDs, including particular FPGAs, to drive switches 342-348 and 362-368 directly without giving up board space and additional power draw that would otherwise be needed for a logic level translator.

In various embodiments, first stage 340 may include a capacitor 354 coupled between output 350 and the ground of motor driver 140 such that capacitor 354 and inductor 352 form a low pass filter that is integrated with first stage 340 and configured to low pass filter signals generated by first stage 340. For example, a capacitance of capacitor 354 may be chosen to cause the resulting low pass filter to filter switching noise associated with operation of switches 342-348 (e.g., PWM frequency-scale switching noise), regardless of the chosen inductance for inductor 352. Because such low pass filter is integrated with first stage 340 (e.g., by utilizing inductor 352 as an element of the low pass filter), the total number of electrical components required to enable low pass filtering of the output of first stage 140 is reduced, thereby reducing overall size while retaining relatively desirable low noise characteristics, and the electrical efficiency of motor driver 140 may be increased (e.g., by limiting the parasitic series resistance and/or other detrimental operating characteristics of circuitry generally associated with an increased number of electrical components in a signal path).

Figure 4:
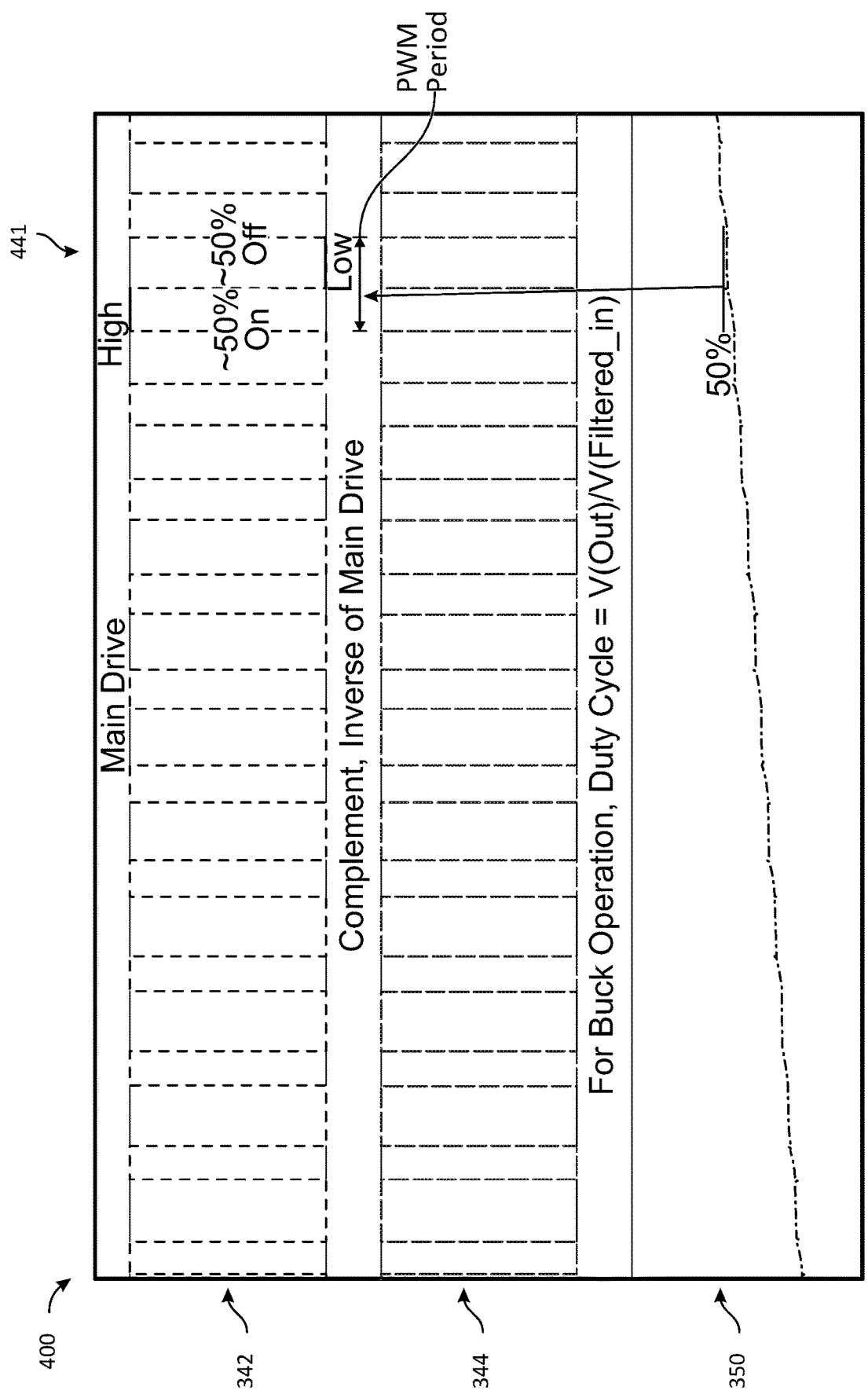
FIG. 4 illustrates buck-mode driver control signals for a motor driver of a cryocooler controller in accordance with an embodiment of the disclosure.

FIG. 4 illustrates buck-mode driver control signals generated by motor driver controller 130 for switches 342 and 344 of motor driver 140 in accordance with an embodiment of the disclosure. For example, while generating a portion of a rectified sine wave at output 350 of first stage 340 with a voltage level Vout below the voltage level Vin of a DC input voltage supplied by power supply 112 to input 313 of motor driver 140, first stage 340 may be in a buck-mode (e.g., as set forth in table 341 of FIG. 3), and motor driver controller 130 may be configured to provide PWM pulses modulated similar to the main drive signal trace provided to switch 342 and the complementary signal trace provided to switch 344, while holding switch 346 closed and switch 348 open. While in buck-mode, the duty cycle D of the main drive PWM pulses is roughly proportional to the output voltage Vout of first stage 340, according to the equation D=Vout/Vin. As shown in FIG. 4, signal traces 342, 344, and 350 illustrate a buck-mode of motor driver 140, as selected by the control signals generated by motor driver controller 130 up to an approximate buck-mode output voltage level (for a rectified sine wave output) of half the input voltage level, indicated by arrow 441, which corresponds to main drive PWM pulses with a duty cycle of 50% (e.g., equal on and off pulse width durations).

Figure 5:
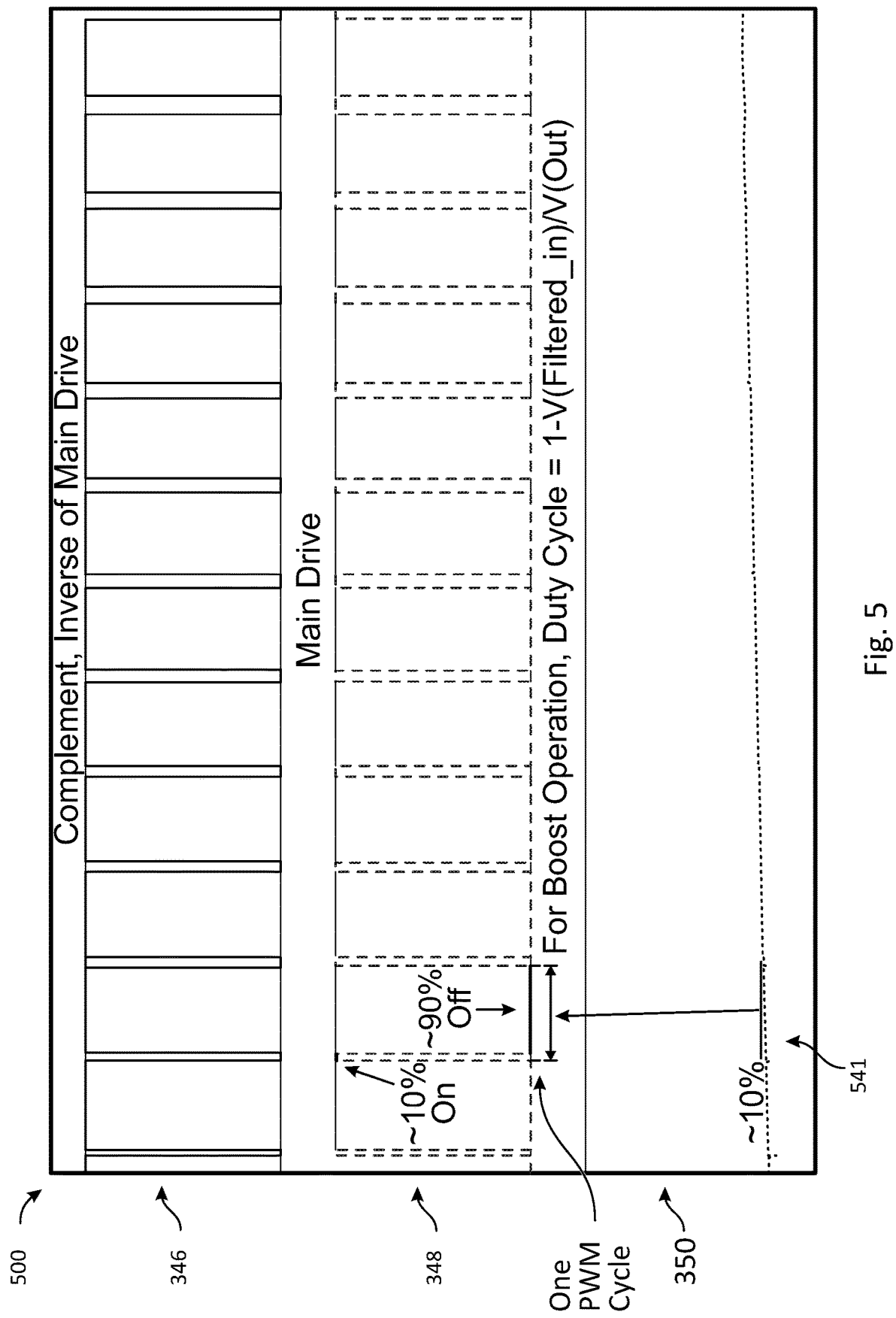
FIG. 5 illustrates boost-mode driver control signals for a motor driver of a cryocooler controller in accordance with an embodiment of the disclosure.

FIG. 5 illustrates boost-mode driver control signals generated by motor driver controller 130 for switches 346 and 348 of motor driver 140 in accordance with an embodiment of the disclosure. For example, while generating a portion of a rectified sine wave at output 350 of first stage 340 with a voltage level Vout above the voltage level Vin of the DC input voltage supplied by power supply 112 to input 313 of motor driver 140, first stage 340 may be in a boost-mode (e.g., as set forth in table 341 of FIG. 3), and motor driver controller 130 may be configured to provide PWM pulses modulated similar to the main drive signal trace provided to switch 348 and the complementary signal trace provided to switch 346, while holding switch 342 closed and switch 344 open. While in boost-mode, the duty cycle D of the main drive PWM pulses roughly follows the equation D=1−Vin/Vout. As shown in FIG. 5, signal traces 346, 348, and 350 illustrate a boost-mode of motor driver 140, as selected by the control signals generated by motor driver controller 130 increasing from an approximate boost-mode output voltage level (for a rectified sine wave output) of approximately 10-11% above the input voltage level, indicated by arrow 541, which corresponds to main drive PWM pulses with a duty cycle of approximately 10% (e.g., on for 10% of a single PWM cycle, and off for 90% of a single PWM cycle).

Figure 6:
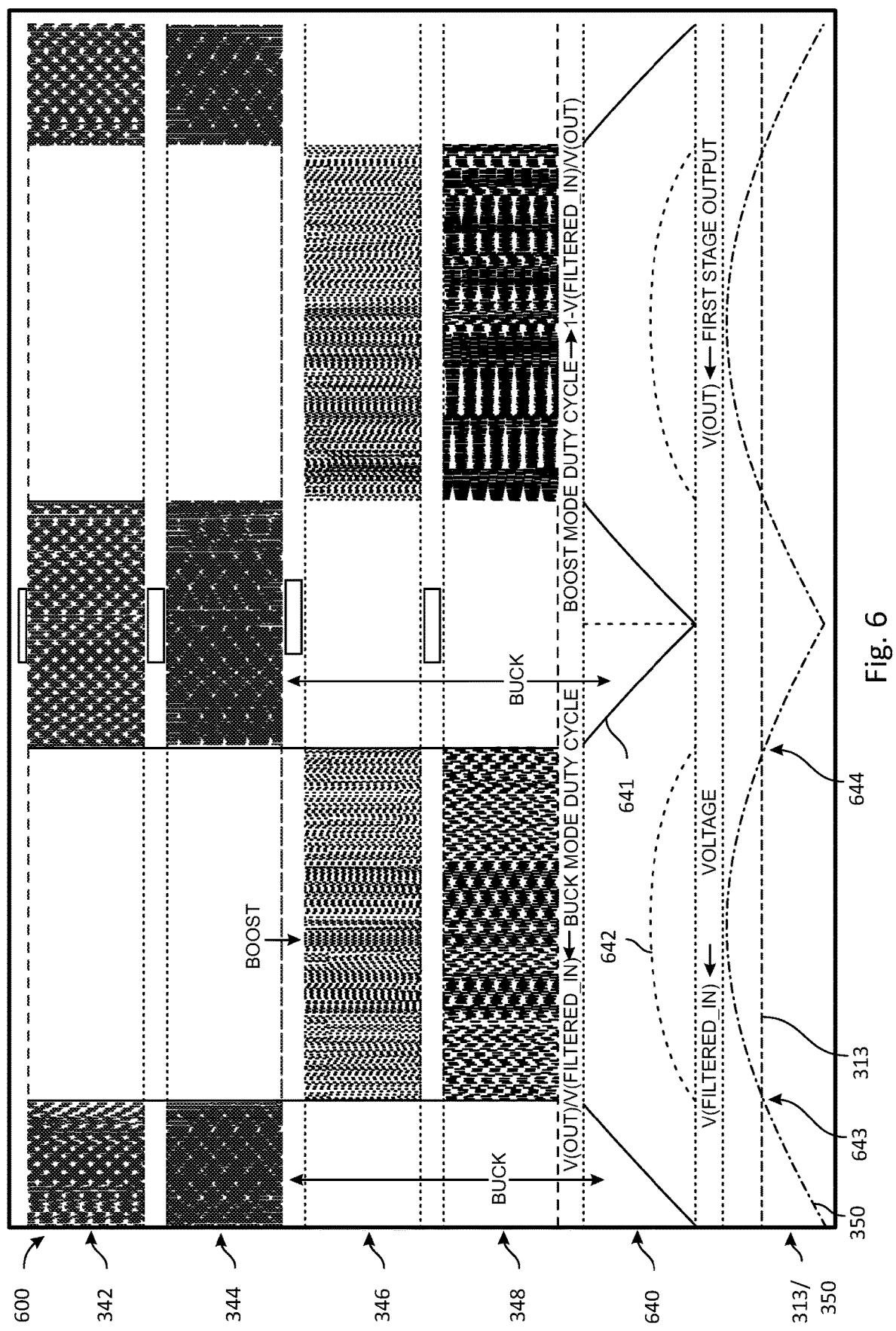
FIG. 6 illustrates buck-mode and boost-mode driver control signals for a motor driver of a cryocooler controller and resulting output motor drive signals in accordance with an embodiment of the disclosure.

FIG. 6 illustrates buck-mode and boost-mode driver control signals generated by motor driver controller 130 for switches 342-348 of motor driver 140 and resulting output motor drive signals in accordance with an embodiment of the disclosure. In addition, FIG. 6 illustrates the expected minimal or non-existent signal transient when motor driver 140 transitions between buck-mode and boost-mode, as controlled by motor driver controller 130, which is roughly indicated by arrows 643 and 644 in first stage output voltage signal trace 350, referenced by overlaid DC input voltage signal trace 313. In particular, signal traces 342-348 illustrate a time series of various PWM and mode selection driver control signals provided to switches 342-348 that are configured to generate a rectified sine wave at output 350 of first stage 340 with a voltage amplitude greater than a voltage level Vin of the DC input voltage supplied by power supply 112 to input 313 of motor driver 140. As shown in FIG. 6, signal trace 640 includes buck-mode output 641 of first stage 340 separate from boost-mode output 642 of first stage 340 (e.g., which is also negatively biased by Vin to emphasize the separation), and signal trace 313/350 includes the aggregate buck-mode and boost-mode output 350 of first stage 340 overlaid by input voltage signal trace 313 for visual reference.

By providing a motor driver 140 capable of both buck and boost-mode operation, and controlled to provide such operations substantially without transients between mode transitions, embodiments are able to provide a highly flexible cryocooler controller that can provide a relatively wide range of cooling powers and/or stable operating temperatures for a given supply voltage. Moreover, because the output signal voltage amplitude is not hard limited to the maximum input supply voltage, embodiments are able to employ feedback techniques that can compensate for, and provide relatively stable cryocooler operation in spite of, a varying or drifting supply voltage.

Figure 7:
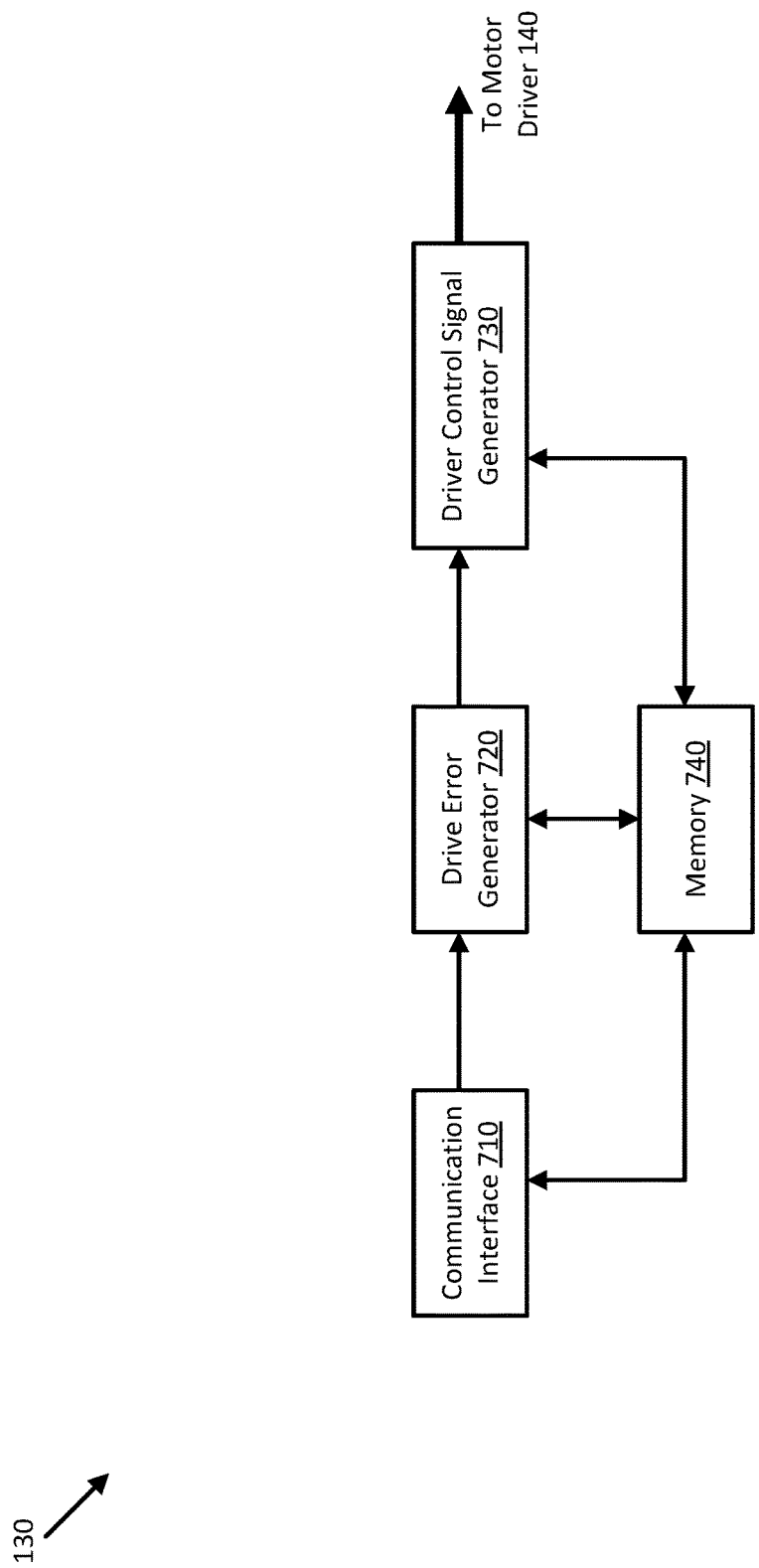
FIG. 7 illustrates a block diagram of a motor driver controller for a cryocooler controller in accordance with an embodiment of the disclosure.

FIG. 7 illustrates a block diagram of motor driver controller 130 for cryocooler controller 120 in accordance with an embodiment of the disclosure. In various embodiments, elements of motor driver controller 130 may be implemented in digital and/or analog circuitry configured to perform the operations described herein. In some embodiments, all the elements of motor driver controller 120 and their functionality may be implemented in a PLD. As such, elements of motor driver controller 120, their interconnections, and/or their functionality may be configured and/or updated (e.g., by user interface 110) to perform any of the methods described herein, for example, including updates that take place substantially during runtime of motor driver controller 130.

As shown in FIG. 7, motor driver controller 130 may include communication interface 710, drive error generator 720, and/or driver control signal generator 730, each of which may be configured to communicate with memory 740 (e.g., to store and/or retrieve operational parameters, sensor and/or feedback data, operational state data, time series of such data, and/or other information, as described herein). In general, driver control signal generator 730 may be configured to receive a drive error from drive error generator 720 and/or additional operational parameters or other data from memory 740 and generate corresponding control signals to control operation of motor driver 140, as shown.

Communication interface 710 may be configured to support digital communication of data according to a variety of different formats and/or protocols between motor driver controller 130 and/or elements of motor driver controller 130, feedback interface 132, user interface 120, and/or other components of system 100 of FIG. 1. For example, communication interface 710 may be configured to support UART based data communication between user interface 110 and memory 740, SPI based data communication between feedback interface 132, memory 740, and/or drive error generator 720, and/or other digital communication between components of system 100.

In addition, communication interface 710 may be configured to support other signal interfaces facilitating operation of motor driver controller 130, such as a system clock input interface and/or on/off/standby enable/disable signal interfaces configured to manually enable/override programmatic operation of motor driver controller 130 (e.g., by analog switches coupled directly to/integrated with cryocooler controller 120, as opposed to similar functionality provided through digital communications to elements of motor driver controller 130).

Drive error generator 720 may be configured to receive feedback data corresponding to measured sensor signals, operational states, and/or other operational characteristics of motor 172, cold finger 176, and/or other elements of cryocooler 170, and/or various components of system 100, for example, along with various operational parameters corresponding to operation of cryocooler 170 controlled by cryocooler controller 120, and to generate a drive error based on the received data. In general, the drive error represents a measure of the error between a desired operational state of cryocooler 170 and a measured operational state of cryocooler 170. In some embodiments, the drive error may take the form of a gain factor used to adjust driver control signals generated by motor driver controller 130, such that voltage levels/amplitudes of resulting drive signals generated by motor driver 140 (e.g., as controlled by the driver control signals generated by motor driver controller 130) are effectively scaled by the drive error in an attempt to force the measured operational state of cryocooler 170 to converge towards the desired operational state of cryocooler 170 (e.g., to compensate for and/or reduce the magnitude of the drive error). Additional details regarding an implementation of driver error generator 720 are provided with reference to FIG. 8.

Driver control signal generator 730 may be configured to receive a drive error from drive error generator 720, for example, along with various operational parameters corresponding to operation of cryocooler 170 controlled by cryocooler controller 120, and to generate corresponding drive control signals configured to operate motor driver 140 and/or drive motor 172 of cryocooler 170 according to a desired operational state or characteristic of cryocooler 170 and/or other elements of system 100. Additional details regarding an implementation of driver control signal generator 730 are provided with reference to FIG. 9A.

Memory 740 may be implemented by registers, memory cells, flash memory, and/or other memory structures and/or logic devices or structures configured to store digital data provided by various elements of motor driver controller 130, cryocooler controller 120, and/or system 100, and/or to provide stored data to such elements, as described herein. As noted herein, in embodiments where motor driver controller 130 is implemented by a PLD, memory 740 may be implemented at least in part by registers implemented or designated within configurable resources of the PLD, which can be reconfigured (e.g., to increase or reduce storage capacity) prior to operation/execution of motor driver controller 130 and/or during runtime.

Figure 8:
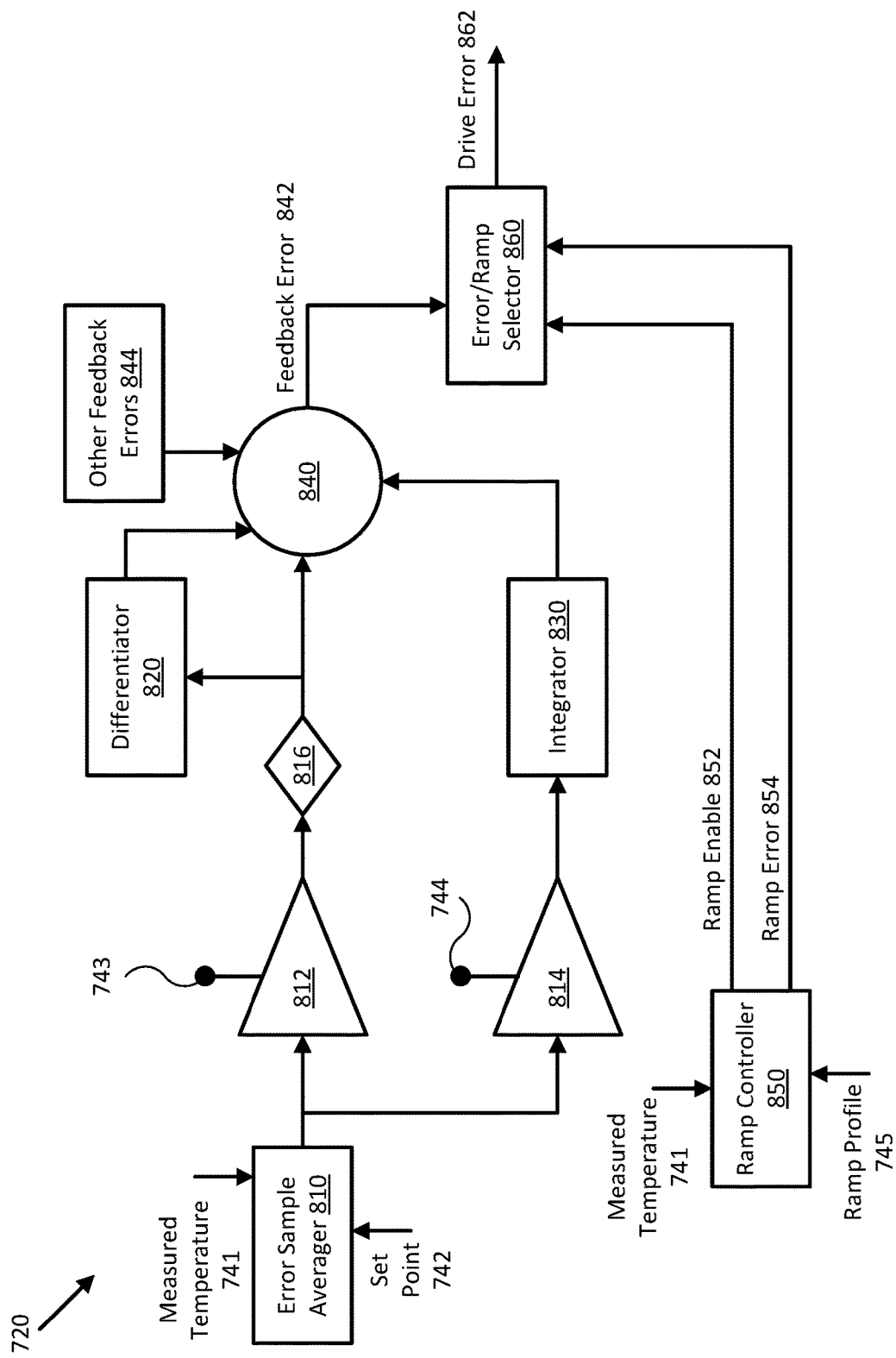
FIG. 8 illustrates a block diagram of a drive error generator for a motor driver controller of a cryocooler controller in accordance with an embodiment of the disclosure.

FIG. 8 illustrates a block diagram of drive error generator 720 for motor driver controller 130 of cryocooler controller 120 in accordance with an embodiment of the disclosure. In general, drive error generator 720 may generally include one or more proportional-integral-derivative feedback mechanisms (e.g., PID controllers) and/or other types of feedback mechanisms configured to monitor a deviation from a desired operational state of cryocooler 170 and/or other elements of system 100 and generate a drive error 862 configured to compensate for and/or minimize the deviation from the desired operational state (e.g., when used to adjust operation of cryocooler 170 by adjusting driver control signals used, in turn, to control operation of motor driver 140, as described herein).

As shown in FIG. 8, elements 810 through 840 generally implement a PID controller configured to generate a feedback error 842 based on a measured temperature 741 (e.g., of cold finger 176 and/or FPA 182) and a desired temperature (e.g., set point 742). In particular, error sample averager 810 may be configured to average a series of measured temperatures 741 (e.g., typically 1 to 4 samples, which may be provided by feedback interface 132 and/or stored within/retrieved from memory 740) and determine a difference between the average measured temperature and set point 742 (e.g., an operational parameter, which may be provided by user interface 110 and/or stored within/retrieved from memory 740), which is then provided to variable gain blocks 812 and 814.

Variable gain blocks 812 and 814 may be controlled by gain or scale factors 743 and 744 provided by user interface 110 and/or stored within/retrieved from memory 740. In some embodiments, variable gain blocks 812 and 814 may be implemented as bit shifters configured to shift values provided to blocks 812 and 814 by a set number of bits (e.g., individually set by gain factors/registers 743 and 744) to increase/decrease the proportional (e.g., block 812) or integral (e.g., block 814) contribution to feedback error 842. Differentiator 820 may be configured to determine a differential contribution to feedback error 842, and integrator 830 may be configured to determine the integral contribution to feedback error 842. Combination block 840 may be configured to combine the various PID contributions to generate feedback error 842.

Additional PID or similar controllers configured to generate feedback errors related to other operational states of system 100 (e.g., a measured input voltage of a power signal received at input 313 of motor driver 140, a measured output voltage of drive signals generated by motor driver 140, a measured temperature of cryocooler controller 120, and/or other operation states of system 100) may also be implemented as part of drive error generator 720 (e.g., other feedback errors 844), and all such feedback errors may be combined at combination block 840 (e.g., according to individual weight factors and/or other aggregation mechanisms) to produce an aggregate feedback error 842 configured to compensate for and/or minimize deviations away from one or more corresponding desired operational states.

At various points within the data flow illustrated by FIG. 8 and/or elsewhere in FIGS. 1 and 7-9C, measured, retrieved, and/or calculated data may be clipped (e.g., limited to a range of values) in order to minimize and/or foreclose unphysical or undesirable feedback errors, drive errors, and/or resulting control signals and/or other operational parameters. For example, in some embodiments, drive error generator 720 may include clipper block 816 disposed between variable gain block 812 and differentiator 820/ combination block 840 and configured to limit the proportional contribution to a certain bit width (e.g., magnitude). Similar clipper blocks may be disposed within averager 810 and/or integrator 830 to limit the effect of transients and/or otherwise stabilize operation of drive error generator 720, for example.

In some embodiments, drive error generator 720 may be implemented with ramp controller 850, which may be configured to reduce a risk of knocking caused by relatively high drive signal amplitudes being provided to motor 172 while refrigerator 174 and/or the associated working gas is relatively warm and (typically) viscous. In embodiments where drive error generator 720 includes ramp controller 850, ramp controller 850 may be configured to determine if cryocooler 170 is in a initialization, warm, or cool-down state, for example, based on feedback data corresponding to an operational state of cryocooler 170, such as measured temperature 741 (e.g., of cold finger 176 and/or electronic device/camera 180), a detected change in a measured output voltage of drive signals generated by motor driver 140 (e.g., from zero to non-zero), and/or other feedback data, which may be compared to various operational parameters and/or operational states stored within/retrieved from memory 740 (e.g., a measured ambient temperature and/or temperature of cryocooler controller 120, and/or other parameters, states, or feedback data). If such state is detected, ramp controller 850 may be configured to set ramp enable signal 852 to "true," thereby selecting ramp error 854 as the drive error 862 at error/ramp selector 860, as shown.

Ramp controller 850 may be configured to generate ramp error 854 based on a ramp profile 745 (e.g., provided by user interface 110 and/or stored within/retrieved from memory 740), which may correspond to a drive error 862 that gradually increases from a value of zero (e.g., resulting in a drive signal generated by motor driver 140 with a voltage amplitude of zero) to a value of 1 (e.g., resulting in a drive signal generated by motor driver 140 with a default or steady-state/unadjusted voltage amplitude). In some embodiments, ramp profile 745 may take the form of a scale factor, which may be used to adjust the counting rate and/or step size of a counter (e.g., implemented within ramp controller 850 and triggered by a clock signal driving motor driver controller 130) configured to start incrementing a count when ramp enable 852 is set to true. In such embodiments, ramp error 854 may be set equal to the incrementing count. Other non-linear ramp profiles are contemplated, for example, and in general ramp error 854 may depend on ramp profile 745 and various feedback data and/or operational states of cryocooler 170 (e.g., including one or more measured temperatures of elements of cryocooler 170 and/or other components of system 100, such that ramp error 854 is temperature dependent). Upon detecting an end of a time-based ramp profile 745 and/or a sufficiently low measured temperature 741 (e.g., below a stored threshold temperature or approaching set point 742), ramp controller 850 may set ramp enable signal 852 to "false" to select feedback error 842 as the drive error 862 at error/ramp selector 860, as shown.

Figure 9A:
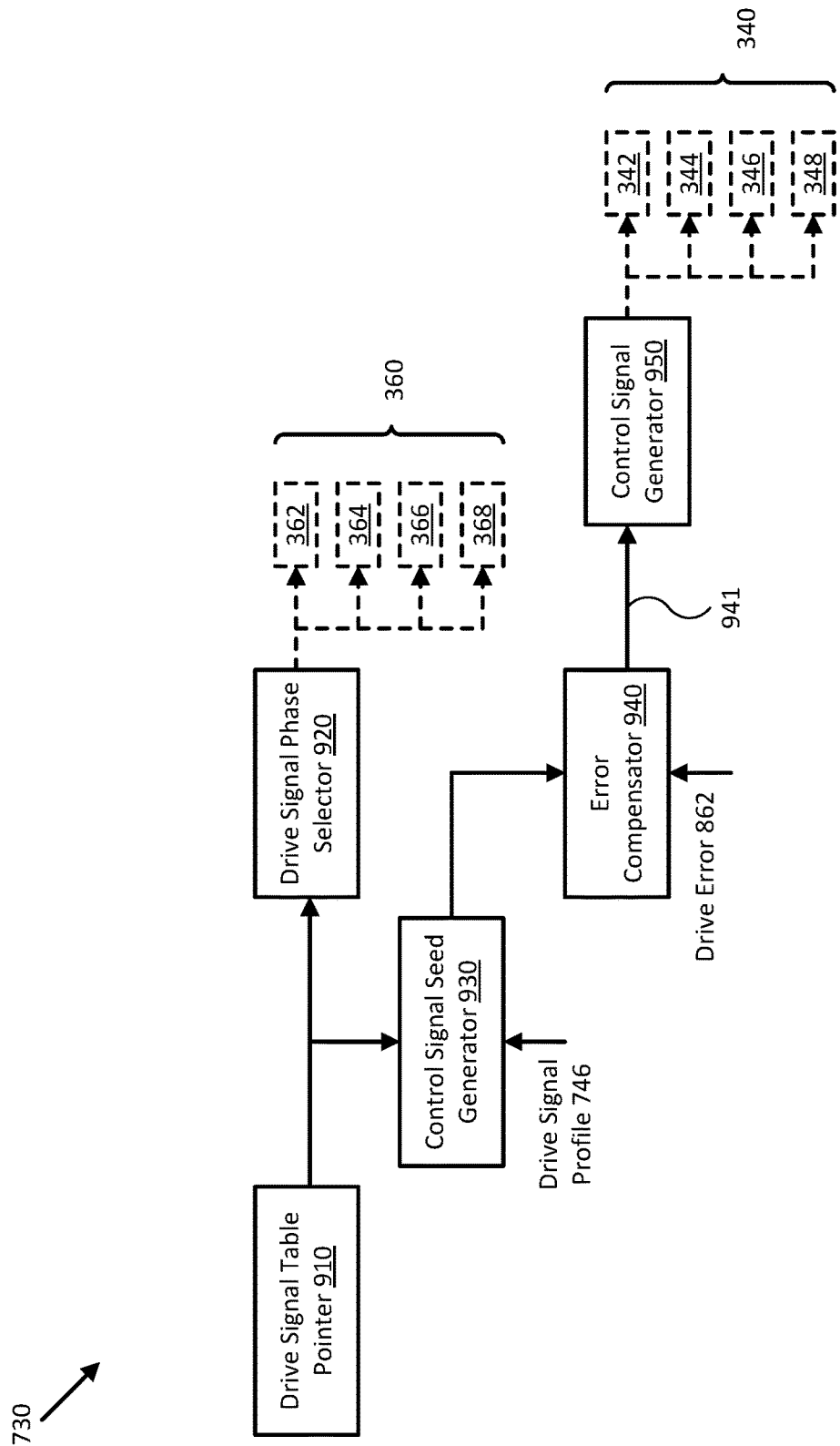
FIG. 9A illustrates a block diagram of a driver control signal generator for a motor driver controller of a cryocooler controller in accordance with an embodiment of the disclosure.

FIG. 9A illustrates a block diagram of driver control signal generator 730 for motor driver controller 130 of cryocooler controller 120 in accordance with an embodiment of the disclosure. In general, driver control signal generator 730 may be configured to generate various control signals to control operation of switches 342-348 of first stage 340 of motor driver 140 and operation of switches 362-368 of second stage 360 of motor driver 140 to cause motor driver 140 to produce drive signals according to a desired waveform. Typically, such desired waveform is a pure sine wave with programmatically variable amplitude that may be adjusted by drive error 862 to force cryocooler 170 to operate at a desired operational state or to converge towards the desired operational state over time. More generally, such desired waveform may have any desired shape with a programmatically variable amplitude, frequency, and/ or other waveform characteristic that may be adjusted to adjust (e.g., typically improve) a performance of cryocooler 170 and/or other components of system 100.

In the embodiment illustrated by FIG. 9A, driver control signal generator 730 includes drive signal table pointer 910 configured to provide a pointer index to drive signal phase selector 920 and control signal seed generator 930. Drive signal phase selector 920 is configured to provide control signals to switches 362-368 of second stage 360 of motor driver 140, which in some embodiments may be configured to cause switches 362-368 to convert a rectified sine wave generated by first stage 340 of motor driver 140 into a full sine wave across differential output 323. Such full sign wave may then be provided to motor 172, as shown in FIG. 3.

For example, in some embodiments drive signal table pointer 910 may be implemented by a counter counting through the indexes of a table corresponding to a rectified sine wave version of drive signal profile 746. Upon reaching an end of such table, drive signal table pointer 910 may restart the count to the beginning of such table. Drive signal phase selector 920 may be configured to detect the restart of the count and provide control signals to switches 362-368 of second stage 360 to cause switches 362-368 to reverse a polarity of differential output 323 relative to output 350 of first stage 340 and generate a full sine wave across differential output 323, as described herein.

Control signal seed generator 930 may be configured to retrieve a drive signal profile 746 (e.g., from memory 740) and determine a control signal seed parameter based on the pointer index provided by drive signal table pointer 910 and drive signal profile 746, and the determined control signal seed parameter may then be provided to error compensator 940. For example, drive signal profile 746 may be implemented as a table of main drive PWM control signal duty cycles (e.g., a table of control signal seed parameters) configured to cause motor driver 140 to generate a rectified sine wave with a predetermined or desired voltage amplitude at output 350 (e.g., when supplied as a time series of control signals with corresponding boost/buck control signals as appropriate). Such predetermined voltage amplitude may be selected (e.g., based on prior operation of system 100) to produce a desired cool-down time, steady state cooling power or operating temperature, and/or other desired operational state of cryocooler 170 and/or system 100, for example, to operate motor driver 140 in a buck-mode by default, or to maximize available cooling power generated by cryocooler 170 by default (e.g., prior to adjustment by drive error 862). Other drive signal profiles corresponding to different waveforms and/or including different control signal seed parameters are contemplated.

Error compensator 940 may be configured to receive drive error 862 (e.g., provided by drive error generator 720) and a control signal seed parameter from control signal seed generator 930 and determine a corresponding error-adjusted control signal parameter 941, and the determined error-adjusted control signal parameter 941 may then be provided to control signal generator 950. For example, error compensator 940 may receive a main drive PWM control signal duty cycle from control signal seed generator 930 and be configured to multiply the received main drive PWM control signal duty cycle by drive error 862 to generate an error-adjusted main drive PWM control signal duty cycle configured to cause motor driver 140 to generate a motor drive signal tending to minimize deviation from and/or converge towards a desired operational state of cryocooler 170 and/or other components of system 100 over time, as described herein.

Control signal generator 950 may be configured to receive error-adjusted control signal parameter 941 generated by error compensator 940 and to provide corresponding control signals to switches 342-348 of first stage 340 of motor driver 140, which may be configured to cause switches 342-348 to generate a drive signal corresponding to drive signal profile 746 with an amplitude or other waveform characteristic adjusted by drive error 862. For example, control signal generator 950 may receive an error-adjusted main drive PWM control signal duty cycle from error compensator 940 and be configured to generate a corresponding error-adjusted main drive PWM control signal, a complementary PWM control signal, and corresponding boost/buck control signals, and provide each and/or all four control signals to switches 342-348 as appropriate (e.g., as indicated by table 341 in FIG. 3).

In a particular related embodiment, the resolution (in bits) of the error-adjusted main drive PWM control signal duty cycle may be selected (e.g., along with other characteristics of data processed by driver control signal generator 730 and/or motor driver controller 130) such that the most significant bit of the error-adjusted main drive PWM control signal duty cycle enables or disables a boost-mode of first stage 340 of motor driver 140, and the remaining least significant bits define the main drive PWM control signal duty cycle/pulse width. As such, when processed within embodiments of driver control signal generator 730, the error-adjusted main drive PWM control signal duty cycle may, at its extremes, vary roughly from 0% to 200% (e.g., from values of zero to two), relative to a maximum output of first stage 340 of motor driver 140 while in a buck-mode. Clipping (e.g., upper, lower, and/or magnitude clipping) may be applied at various points within driver control signal generator 730 to help limit excursions of the error-adjusted main drive PWM control signal duty cycle outside of this range.

In addition to the above, drive signal phase selector 920 and control signal generator 950 may each be configured to insert a specified dead time in between complementary switching states and/or buck/boost-mode transitions (e.g., of first stage 340) and/or polarity transitions (e.g., of second stage 360), so as to provide shoot-through protection to prevent shorting input 313 or output 350 to ground. For example, with respect to first stage 340, such dead time may be a duration of a single clock cycle of the clock signal driving motor driver controller 130, or may be sufficiently long to account for a switching time of any of switches 342-348. A similar dead time may be selected for second stage 360. While such switching can produce transients within motor driver 140, any such transients generated within first stage 340 are roughly the same or higher frequency as the maximum switching frequency of switches 342-348, and such frequencies are effectively filtered by the low pass filter integrated with first stage 340, as described herein. Moreover, such dead times are typically only generated in second stage 360 approximately when drive signals output by first stage 340 at output 350 are approximately zero, and so the amplitude of any such transients in second stage 360 are typically also approximately zero and do not negatively impact the noise characteristics of motor driver 140.

While the embodiments of drive error generator 720 illustrated in FIG. 8 and driver control signal generator 730 illustrated in FIG. 9A are primarily configured to adjust an amplitude of the resulting drive signals generated by motor driver 140, in other embodiments, drive error generator 720 and/or control signal generator 730 may be implemented with logic to adjust a frequency and/or other waveform characteristics of the resulting drive signals to help minimize a deviation from a desired operational state, for example, and/or to maximize cryocooler performance. For example, the number of entries in a table corresponding to drive signal profile 746 and/or the increment rate of a counter configured to implement drive signal table pointer 910 may be adjusted (e.g., relative to a clock signal driving operation of driver control signal generator 730 and/or motor driver controller 130) to adjust a frequency of a drive signal corresponding to drive signal profile 746.

Such adjustments may be propagated out to drive signal phase selector 920, error compensator 940, and/or control signal generator 950, and the resulting drive signals generated by motor driver 140 may produce changes in the operational characteristics of cryocooler 170 and/or other components of system 100 that can be measured and fed back into cryocooler controller 120 and tracked over a range of drive signal frequencies and/or other operational parameters to determine a relationship between drive signal frequency and performance. Such relationship can change over time, due to wear associated with long term operation of motor 172 and/or other elements of cryocooler 170, for example, and a performance search may be performed periodically to track such relationship over time and identify updated optimum operating parameters as system 100 ages. More generally, any such performance to operational parameter relationship may be searched and tracked over time to help select optimum operational parameters for system 100.

Figure 9B:
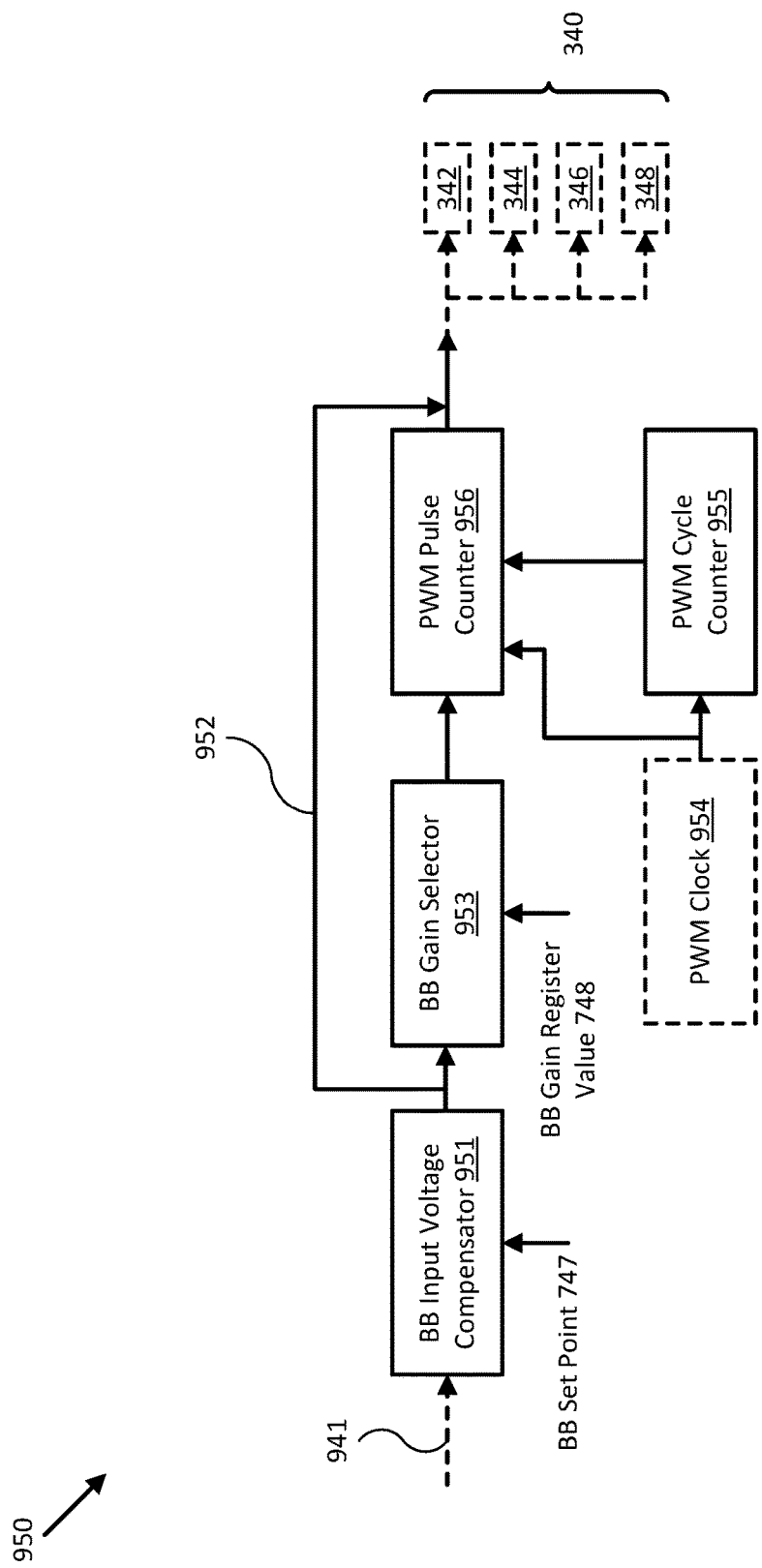
FIG. 9B illustrates a block diagram of a control signal generator for a driver control signal generator of a cryocooler controller in accordance with an embodiment of the disclosure.

FIG. 9B illustrates a block diagram of control signal generator 950 for driver control signal generator 730 of cryocooler controller 120 in accordance with an embodiment of the disclosure. In general, control signal generator 950 may be configured to control operation of switches 342-348 of first stage 340 of motor driver 140 to cause motor driver 140 to produce drive signals according to a desired waveform. More specifically, as noted in the discussion of FIGS. 8-9A, control signal generator 950 may be configured to receive error-adjusted control signal parameter 941 generated by error compensator 940 and to provide corresponding control signals to switches 342-348 of first stage 340 of motor driver 140, which may be configured to cause switches 342-348 to generate a drive signal corresponding to drive signal profile 746 with an amplitude or other waveform characteristic adjusted by drive error 862, for example, and/or additional compensation values, as described herein.

For example, in the embodiment illustrated by FIG. 9B, control signal generator 950 includes buck-boost (BB) input voltage compensator 951 configured to provide an input voltage compensated control signal parameter (e.g., based on error-adjusted control signal parameter 941 provided by error compensator 940) to BB gain selector 953, which in turn may be configured to apply a selected BB gain to the input voltage compensated control signal parameter provided by (BB) input voltage compensator 951 and provide the resulting compensated control signal parameter to PWM pulse counter 956, as shown. PWM clock 954, PWM cycle counter 955, and PWM pulse counter 956 may be configured to generate PWM control signals corresponding to the compensated control signal parameter generated by BB input voltage compensator 951 and/or BB gain selector 953 and provide such control signals to switches 342-348 of first stage 340 of motor driver 140, which may be configured to cause switches 342-348 to generate a drive signal corresponding to drive signal profile 746 and/or error-adjusted control signal parameter 941 with an amplitude or other waveform characteristic adjusted by BB input voltage compensator 951 and/or BB gain selector 953.

For example, PWM pulse counter 956 may be configured to receive a compensated main drive PWM control signal duty cycle from BB input voltage compensator 951 and/or BB gain selector 953 and to generate a corresponding compensated main drive PWM control signal and a complementary PWM control signal (e.g., based on a PWN clock signal provided by PWM clock 954 and a PWM cycle signal provided by PWM cycle counter 955), and provide each and/or all four control signals to switches 342-348 as appropriate (e.g., as indicated by table 341 in FIG. 3). In a particular related embodiment, the resolution (in bits) of the compensated main drive PWM control signal duty cycle provided by BB input voltage compensator 951 and/or BB gain selector 953 may be selected (e.g., along with other characteristics of data processed by control signal generator 950) such that the most significant bit 952 of the compensated main drive PWM control signal duty cycle enables or disables a boost-mode of first stage 340 of motor driver 140, and the remaining least significant bits define the main drive PWM control signal duty cycle/pulse width. Clipping (e.g., upper, lower, and/or magnitude clipping) may be applied at various points within control signal generator 950 to help limit excursions of the compensated main drive PWM control signal duty cycle.

BB input voltage compensator 951 may be configured to retrieve a BB set point 747 (e.g., from memory 740) and determine an input voltage compensated control signal parameter based on BB set point 747 and error-adjusted control signal parameter 941. Such input voltage compensated control signal parameter may be configured to help produce a desired peak output voltage level at output 350 of motor driver 140 (e.g., Vout), regardless of and/or to compensate for fluctuations in Vin provided at input 313. In various embodiments, BB input voltage compensator 951 may be configured to multiply error-adjusted control signal parameter 941 by BB set point 747 to scale error-adjusted control signal parameter 941 by BB set point 747. BB set point 747 may in some embodiments be implemented as a table value selected from a table of BB set points based on the DC input voltage Vin provided at input 313 of motor driver 140 and configured to cause motor driver 140 to generate a rectified sine wave with a predetermined or desired peak voltage amplitude (e.g., Vout) at output 350. In other embodiments, BB set point 747 may be implemented as a relatively high bit-resolution (e.g., relative to a table value) calculated value provided by logic (e.g., set point generator 947 of FIG. 9C) configured to calculate BB set point 747 during operation of motor driver controller 130, as shown and described in additional detail in FIG. 9C.

BB gain selector 953 may be configured to retrieve a BB gain register value 748 (e.g., from memory 740) and apply a BB gain corresponding to BB gain register value 748 and/or other BB gain values to the input voltage compensated control signal parameter provided by BB input voltage compensator 951 based, at least in part, on a buck or boost-mode of cryocooler controller 120. For example, in some embodiments, BB gain selector 953 may configured to apply a gain of 1 to the input voltage compensated control signal parameter provided by BB input voltage compensator 951 while cryocooler controller 120 is in a buck-mode (e.g., while most significant bit 952 of the compensated main drive PWM control signal duty cycle is '0') and to apply a gain corresponding to BB gain register value 748 while cryocooler controller 120 is in a boost-mode (e.g., while most significant bit 952 of the compensated main drive PWM control signal duty cycle is '1'). In various embodiments, BB gain register value 748 may be implemented as a table value selected from a table of gain values configured to cause motor driver 140 to generate a rectified sine wave with a predetermined voltage amplitude at output 350 while in a boost-mode.

In embodiments where the control signals generated by control signal generator 950 are PWM control signals, PWM clock may optionally be integrated within control signal generator 950, motor driver controller 130, cryocooler controller 120, and/or other elements of system 100, for example, and be configured to provide a constant or variable clock signal to PWM cycle counter 955 and PWM pulse counter 956. Mode selector/most significant bit 952 may be combined with control signals generated by PWM pulse counter 956 and/or PWM cycle counter 955 to cause each and/or all four corresponding control signals (e.g., main drive control signal, complementary PWM control signal, on, off control signals) to switches 342-348 as appropriate (e.g., as indicated by table 341 in FIG. 3).

Figure 9C:
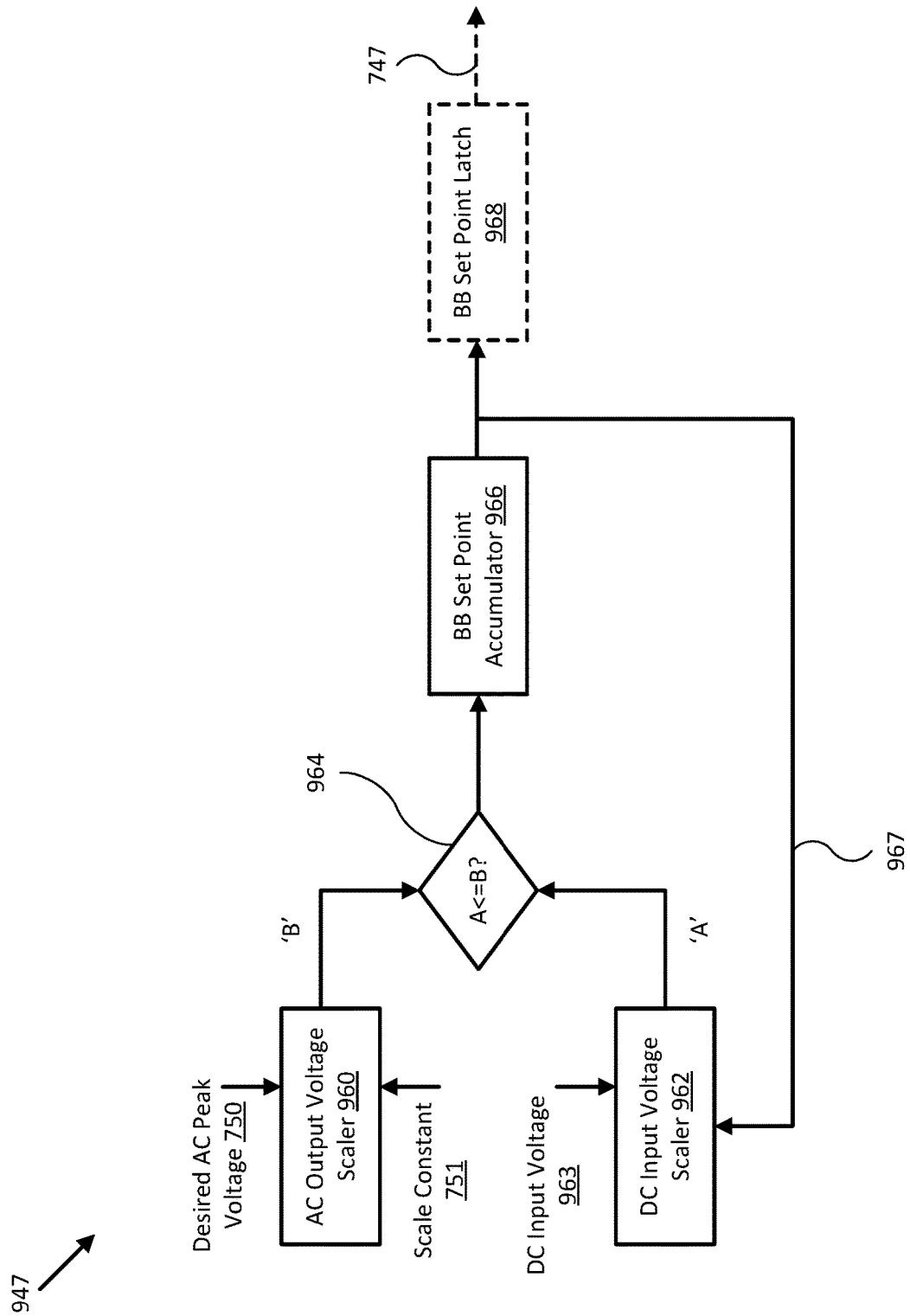
FIG. 9C illustrates a block diagram of a set point generator for a control signal generator of a cryocooler controller in accordance with an embodiment of the disclosure.

FIG. 9C illustrates a block diagram of a set point generator 947 for control signal generator 950 of cryocooler controller 120 in accordance with an embodiment of the disclosure. In general, set point generator 947 may be configured to calculate BB set point 747 during operation of motor driver controller 130 based, at least in part, on a desired peak voltage level (Vout) generated by motor driver 140 at output 350 and/or across differential output 323, and a DC input voltage Vin provided at input 313 of motor driver 140, as shown in FIG. 3. More specifically, as noted in the discussion of FIG. 9B, BB set point 747 may be used to scale error-adjusted control signal parameter 941 to generate (e.g., using BB input voltage compensator 951) an input voltage compensated control signal parameter. Such input voltage compensated control signal parameter may be configured to help produce a desired peak output voltage level at output 350 of motor driver 140 (e.g., Vout), regardless of and/or to compensate for fluctuations in Vin provided at input 313.

Embodiments of set point generator 947 offer benefits over table lookup methods by reducing the memory resources needed to have a table for each different input voltage (or different input voltage bounds) and by providing relatively high resolution values for BB set point 747, which produces a relatively smooth sine wave output at output 350 and/or across differential output 323 for a relatively wide range of input voltages and changes in input voltages over time. Moreover, embodiments of set point generator 947 may be implemented relatively compactly in logic by replacing numerical division logic with an iterative approximation that instead relies on multiplication logic, as described herein, which can be of particular benefit when set point generator 947 is implemented in a PLD.

For example, in the embodiment illustrated by FIG. 9C, set point generator 947 includes an AC output voltage scaler 960, a DC input voltage scaler 962, a comparator 964, a BB set point accumulator 966, and an optional BB set point latch 968 configured to provide BB set point 747. In various embodiments, BB set point latch 968 may be configured to store or latch BB set point 747 into memory 740 and/or provide BB set point 747 to BB input voltage compensator 951. In general, set point generator 947 may be configured to determine BB set point 747 such that when DC input voltage is scaled by BB set point 747, the result is roughly equivalent to desired AC peak voltage 750 scaled by scale constant 751, as shown.

AC output voltage scaler 960 may be configured to retrieve a desired AC peak voltage 750 and a scale constant 751 (e.g., from memory 740) and generate a scaled desired AC peak voltage as output B to comparator 964. In various embodiments, scale constant 751 may be selected to correspond to half the input voltage Vin equivalent of desired AC peak voltage 750, for example, and may be implemented as a 16 bit number. Desired AC peak voltage 750 may be retrieved and/or derived from ramp profile 745 or drive signal profile 746, for example. In some embodiments, AC output voltage scaler 960 may be configured to multiply desired AC peak voltage 750 by scale constant 751 and generate a scaled desired AC peak voltage (e.g., the product) with a specific selected and clipped bit width. For example, in some embodiments, AC output voltage scaler 960 may be configured to clip the top 3 bits of the product and provide the following 16 bits of the product as the scaled desired AC peak voltage (e.g., output B) to comparator 964.

DC input voltage scaler 962 may be configured to retrieve or receive a DC input voltage 963 (e.g., from memory 740 or voltage sensor configured to measure Vin) and generate a scaled desired AC peak voltage as output A to comparator 964. In some embodiments, DC input voltage scaler 962 may be configured to multiply DC input voltage 963 by an initialized set point 967 (e.g., provided by BB set point accumulator 966) and generate a scaled DC input voltage (e.g., the product), which may in some embodiments have the same specific selected and clipped bit width as provided by embodiments of AC output voltage scaler 960.

In various embodiments, comparator 964 may be configured to compare outputs A and B (e.g., the scaled DC input voltage and the scaled desired AC peak voltage) and provide a comparator output to BB set point accumulator 966 corresponding to a difference between output A and B. BB set point accumulator 966 may be configured to generate an updated set point 967 configured to reduce, minimize, and/or eliminate differences between outputs A and B identified by comparator 964 and forward a resulting accumulated set point 967 as BB set point 747 to BB set point latch 968 and/or BB input voltage compensator 951, as described herein.

In a particular embodiment, comparator 964, BB set point accumulator 966, and DC input voltage scaler 962 may be operated in a iterative loop, for example, to iteratively adjust updated/accumulated set point 967 generated by BB set point accumulator 966 to converge towards a BB set point 747 that reduces, minimizes, and/or eliminates differences between outputs A and B (for a particular DC input voltage 963 and desired AC peak voltage 750). For example, an initial 16 bit set point 967 may be initialized to all '0's in all bit positions. Comparator 964, BB set point accumulator 966, and DC input voltage scaler 962 may be iterated for each bit position within 16 bit outputs A and B, starting at the most significant bit (e.g., i=15) and proceeding to the least significant bit (e.g., i=0).

For each iteration, BB set point accumulator 966 may be configured to set bit(i) in accumulated set point 967 to '1' and forward accumulated set point 967 to DC input voltage scaler 962; DC input voltage scaler 962 may be configured to scale DC input voltage 963 by the resulting updated/accumulated set point 967; and comparator 964 may be configured to compare bit(i) in A to bit(i) in B. When bit(i) in A<=bit(i) in B (e.g., comparator 964 returns 'true'), BB set point accumulator 966 allows bit(i) in accumulated set point 967 to remain '1' and the loop proceeds to bit(i−1). When bit(i) in A>bit(i) in B (e.g., comparator 964 returns 'false'), BB set point accumulator 966 sets bit(i) in accumulated set point 967 to '0' and the loop proceeds to bit(i−1).

Upon completion of the iterations (e.g., at bit(0)), output A is roughly equal to output B (e.g., within the bit resolution of set point generator 947) and the resulting accumulated set point 967 is forwarded on as BB set point 747, as shown. Such iterative method of successive approximation thus provides a relatively accurate and reliable BB set point 747 and resulting Vin-normalized Vout at output 350, which increases overall reliability and performance of system 100 under a larger range of environmental conditions, including a thermally or circumstantially variable power supply 112.

Figure 10:
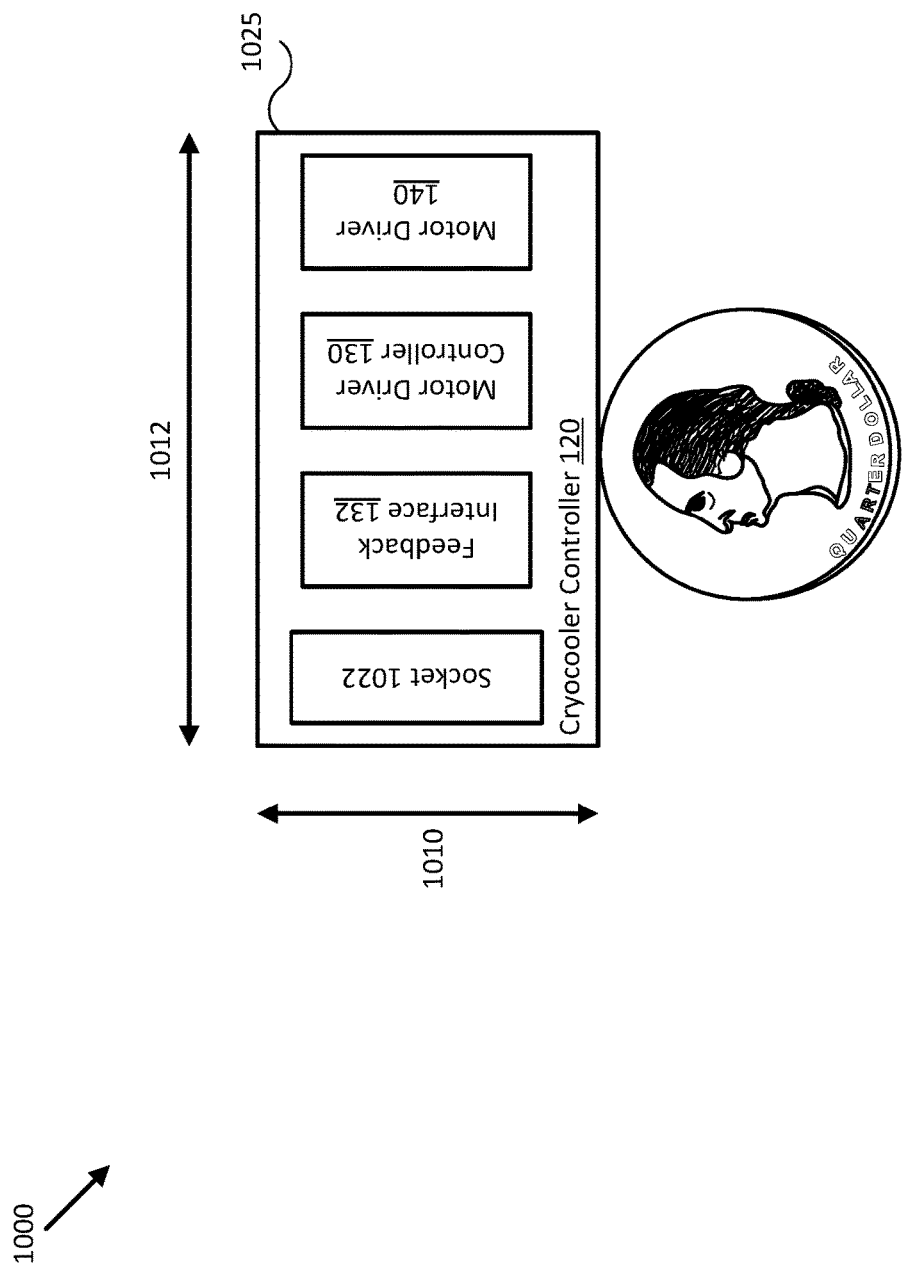
FIG. 10 illustrates a block diagram of a cryocooler controller in accordance with an embodiment of the disclosure.

FIG. 10 illustrates a block diagram of cryocooler controller 120 in accordance with an embodiment of the disclosure. In FIG. 10, an embodiment of cryocooler controller 120 is shown next to a quarter in U.S. currency to illustrate an approximate size of cryocooler controller 120. For example, length 1012 may be approximately 1.8 inches, width 1010 may be approximately 1 inch, and the height may be approximately between 0.5 and 1 inch. In the embodiment illustrated by FIG. 10, cryocooler controller 120 includes socket 1022 along with motor driver controller 130, feedback interface 132, and motor driver 140, all of which can be soldered together onto a printed circuit board 1025 with length 1012 and width 1010, as shown.

As noted herein, such embodiments are able to reach electrical efficiencies (e.g., including all power used to operate motor driver controller 130 and feedback interface 132, in addition to the power used by motor driver 140 to generate drive signals to drive motor 172) greater than 95% at typical power loads. Embodiments are able to generate relatively low noise pure sine wave motor drive signals (e.g., with 40 mV or less ripple and/or noise envelope) with configurable frequencies ranging from approximately 4 Hz to 200 Hz. Embodiments are able to produce AC waveforms with amplitudes greater than 20 Vrms from 12 VDC input power signals, can drive 50 W cryocoolers, and are able to control cryocoolers similar to cryocooler 170 to produce operating temperatures (e.g., as measured at FPA 182) stable to 0.1K in a range from approximately 77K to 150K.

Figure 11:
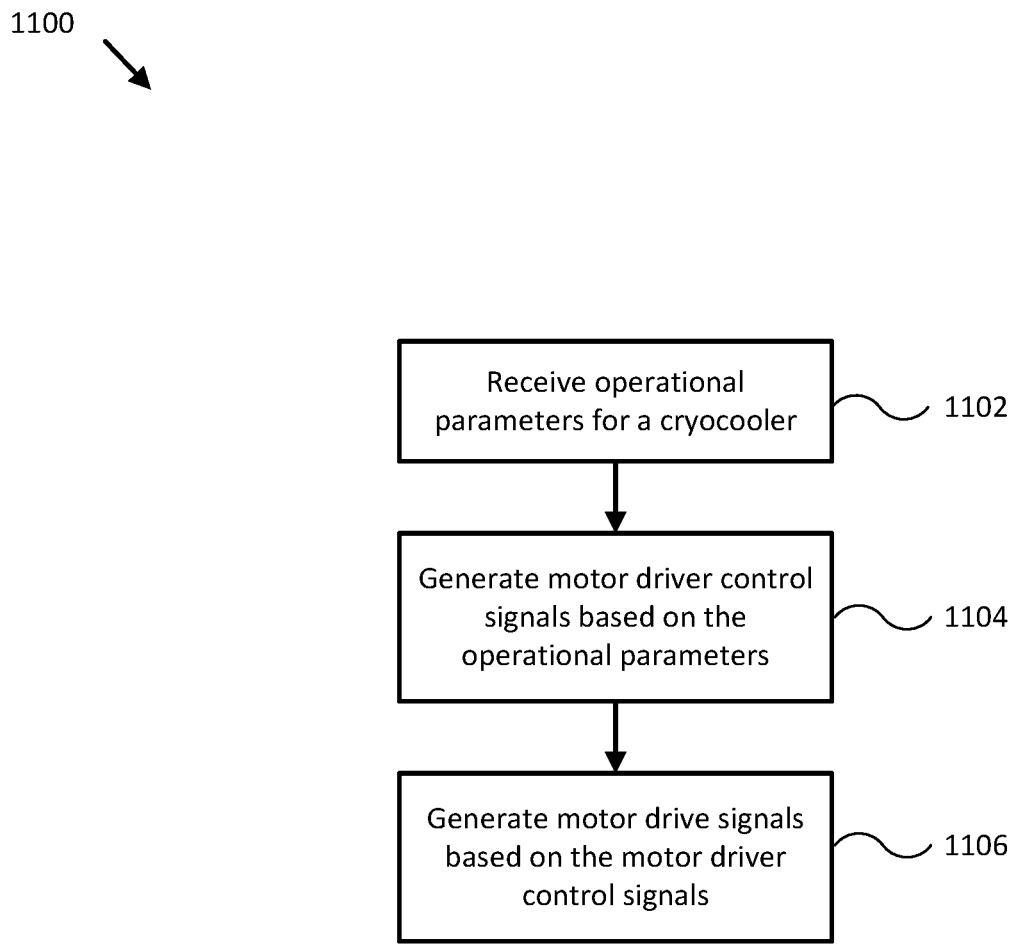
FIG. 11 is a flowchart illustrating a method for operating a cryocooler in accordance with an embodiment of the disclosure.

FIG. 11 is a flowchart illustrating a method for operating a cryocooler controller in accordance with an embodiment of the disclosure. One or more portions of process 1100 may be performed by cryocooler controller 120 and utilizing any elements of systems, components, logic, or methods described with reference to FIGS. 1-10. It should be appreciated that any step, sub-step, sub-process, or block of process 1100 may be performed in an order or arrangement different from the embodiment illustrated by FIG. 11. In some embodiments, any portion of process 1100 may be implemented in a loop so as to continuously operate, such as in a control loop, for example.

At block 1102, operational parameters for a cryocooler are received. For example, motor driver controller 130 of cryocooler controller 120 may be configured to receive operational parameters from user interface 110 and/or memory 740, such as a temperature set point corresponding to a desired temperature for cold finger 176 and/or FPA 182. In some embodiments, motor driver controller 130 may also be configured to receive feedback data corresponding to operation of cryocooler 170 from feedback interface 132. Feedback interface 132 may be configured to receive one or more sensor signals (e.g., from temperature sensors 134 and/or other sources) and generate corresponding feedback data to be delivered to motor driver controller 130, as described herein.

At block 1104, motor driver control signals based, at least in part, on operational parameters for a cryocooler are generated. For example, motor driver controller 130 of cryocooler controller 120 may be configured to generate motor driver control signals for cryocooler 170 based, at least in part, on operational parameters received in block 1102. In some embodiments, motor driver controller 130 may be configured to generate motor driver control signals based, at least in part, on feedback data and/or operational parameters received in block 1102. For example, motor driver controller 130 may be configured to determine feedback error 742 based, at least in part, on set point 742 corresponding to a desired temperature for cold finger 176 and/or electronic device 180 and feedback data corresponding to measured temperature 741 of cold finger 176 and/or electronic device 180. Motor driver controller 130 may then generate motor driver control signals based, at least in part, on the determined feedback error.

In further embodiments, motor driver controller 130 may be configured to determine feedback error 742, ramp enable state 852 corresponding to an operational state of cryocooler 170, and/or ramp error 854 based, at least in part, on feedback data corresponding to measured temperature 741, a measured input voltage of a power signal received at input 313 of motor driver 140, a measured output voltage of drive signals generated by motor driver 140, and/or a measured temperature of cryocooler controller 120. Motor driver controller 130 may then generate motor driver control signals based, at least in part, on the determined feedback error 842, ramp enable state 852, and/or ramp error 854.

At block 1106, motor drive signals based on motor driver control signals are generated. For example, motor driver controller 130 of cryocooler controller 120 may be configured to provide motor driver control signals generated in block 1104 to switches 342-348 of first stage 340 and/or 362-368 of second stage 360 of motor driver 140. In some embodiments, the motor driver control signals provided to switches 342-348 of first stage 340 are configured to cause first stage 340 to convert a direct current power signal received at input 313 of motor driver 140 into a rectified sine wave generated at output 350 of first stage 340. In various embodiments, second stage 360 of motor driver 140 may be configured to convert the rectified sine wave at output 350 of first stage 340 into a full sine wave generated at differential output 323 of motor driver 140.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A cryocooler controller comprising:
   a motor driver controller configured to receive operational parameters corresponding to operation of a cryocooler controlled by the cryocooler controller and generate motor driver control signals based, at least in part, on the received operational parameters; and
   a motor driver configured to receive the motor driver control signals from the motor driver controller and generate drive signals based, at least in part, on the motor driver control signals, to drive a motor of the cryocooler, wherein:
      the motor driver comprises a first stage comprising a first pair of switches coupled serially between an input of the motor driver and a ground of the motor driver, a second pair of switches coupled serially between an output of the first stage and the ground of the motor driver, and an inductor coupled between the first and second pairs of switches, and
      operation of each switch of the first and second pairs of switches is independently controlled by the motor driver control signals generated by the motor driver controller.

2. The cryocooler controller of claim 1, further comprising:
a feedback interface configured to receive one or more sensor signals and generate feedback data corresponding to operation of the cryocooler controlled by the cryocooler controller, wherein the motor driver controller is configured to receive the feedback data from the feedback interface and generate the motor driver control signals based, at least in part, on the feedback data and the operational parameters.

3. The cryocooler controller of claim 2, wherein:
the one or more sensor signals comprises a measured temperature of a cold finger of the cryocooler and/or an electronic device thermally coupled to the cryocooler;
the motor driver controller is configured to determine a feedback error based, at least in part, on a set point corresponding to a desired temperature for the cold finger of the cryocooler and/or the electronic device and feedback data corresponding to the measured temperature of the cold finger of the cryocooler and/or the electronic device; and
the motor driver controller is configured to generate the motor driver control signals based, at least in part, on the determined feedback error.

4. The cryocooler controller of claim 2, wherein:
the motor driver controller is configured to determine a feedback error, a ramp enable state corresponding to an operational state of the cryocooler controlled by the cryocooler controller, a ramp error, and/or a buck-boost set point based, at least in part, on feedback data corresponding to a measured temperature of a cold finger of the cryocooler and/or an electronic device thermally coupled to the cryocooler, a measured input voltage of a power signal received at the input of the motor driver, a measured output voltage of the drive signals generated by the motor driver, and/or a measured temperature of the cryocooler controller; and
the motor driver controller is configured to generate the motor driver control signals based, at least in part, on the determined feedback error, ramp enable state, ramp error, and/or buck-boost set point.

5. The cryocooler controller of claim 1, wherein:
the motor driver control signals are configured to cause the first stage of the motor driver to convert a direct current power signal received at the input of the motor driver into a rectified sine wave generated at the output of the first stage.

6. The cryocooler controller of claim 1, wherein:
the motor driver comprises a second stage coupled to the output of the first stage of the motor driver;
the second stage comprises a third pair of switches coupled serially between the output of the first stage and the ground of the motor driver and a fourth pair of switches coupled serially between the output of the first stage and the ground of the motor driver;
operation of each switch of the third and fourth pairs of switches is independently controlled by the motor driver control signals generated by the motor driver controller; and
the motor driver comprises a differential output coupled between the third and fourth pairs of switches such that at least one switch of the third and fourth pairs of switches is coupled between each lead of the differential output of the motor driver and the output of the first stage or the ground of the motor driver.

7. The cryocooler controller of claim 6, wherein:
the first stage of the motor driver is configured to generate a rectified sine wave at the output of the first stage;
the motor driver control signals are configured to cause the second stage of the motor driver to convert the rectified sine wave at the output of the first stage into a full sine wave generated at the differential output of the motor driver; and
the drive signals generated by the motor driver comprise the full sine wave generated by the second stage of the motor driver.

8. The cryocooler controller of claim 1, wherein:
the motor driver comprises a capacitor coupled to the output of the first stage of the motor driver; and
the capacitor and the inductor are configured to form a low pass filter integrated with the first stage of the motor driver and configured to low pass filter signals generated by the first stage of the motor driver.

9. A system comprising the cryocooler controller of claim 1, the system further comprising:
the cryocooler controlled by the cryocooler controller.

10. The system of claim 7, wherein:
the motor of the cryocooler controlled by the cryocooler controller comprises a linear motor driven by the drive signals generated by the motor driver of the cryocooler controller.

11. The system of claim 7, further comprising:
an electronic device thermally coupled to and at least partially cooled by the cryocooler controlled by the cryocooler controller, wherein the electronic device comprises at least a part of a sensor system or an infrared camera.

12. A method comprising:
receiving, by a motor driver controller of a cryocooler controller, operational parameters corresponding to operation of a cryocooler controlled by the cryocooler controller;
generating motor driver control signals based, at least in part, on the received operational parameters; and
generating, by a motor driver of the cryocooler controller, drive signals based, at least in part, on the motor driver control signals, to drive a motor of the cryocooler, wherein:
the motor driver comprises a first stage comprising a first pair of switches coupled serially between an input of the motor driver and a ground of the motor driver, a second pair of switches coupled serially between an output of the first stage and the ground of the motor driver, and an inductor coupled between the first and second pairs of switches, and
operation of each switch of the first and second pairs of switches is independently controlled by the motor driver control signals generated by the motor driver controller.

13. The method of claim 12, further comprising:
receiving one or more sensor signals corresponding to operation of the cryocooler controlled by the cryocooler controller;
generating feedback data corresponding to the one or more sensor signals;
generating the motor driver control signals based, at least in part, on the feedback data and the operational parameters.

14. The method of claim 13, wherein the one or more sensor signals comprises a measured temperature of a cold finger of the cryocooler and/or an electronic device thermally coupled to the cryocooler, the method further comprising:

determining a feedback error based, at least in part, on a set point corresponding to a desired temperature for the cold finger of the cryocooler and/or the electronic device and feedback data corresponding to the measured temperature of the cold finger of the cryocooler and/or the electronic device; and generating the motor driver control signals based, at least in part, on the determined feedback error.

15. The method of claim 13, further comprising:

determining a feedback error, a ramp enable state corresponding to an operational state of the cryocooler controlled by the cryocooler controller, a ramp error, and/or a buck-boost set point based, at least in part, on feedback data corresponding to a measured temperature of a cold finger of the cryocooler and/or an electronic device thermally coupled to the cryocooler, a measured input voltage of a power signal received at the input of the motor driver, a measured output voltage of the drive signals generated by the motor driver, and/or a measured temperature of the cryocooler controller; and generating the motor driver control signals based, at least in part, on the determined feedback error, ramp enable state, ramp error, and/or buck-boost set point.

16. The method of claim 12, wherein:

the motor driver control signals are configured to cause the first stage of the motor driver to convert a direct current power signal received at the input of the motor driver into a rectified sine wave generated at the output of the first stage.

17. The method of claim 12, wherein:

the motor driver comprises a second stage coupled to the output of the first stage of the motor driver;

the second stage comprises a third pair of switches coupled serially between the output of the first stage and the ground of the motor driver and a fourth pair of switches coupled serially between the output of the first stage and the ground of the motor driver;

operation of each switch of the third and fourth pairs of switches is independently controlled by the motor driver control signals generated by the motor driver controller; and the motor driver comprises a differential output coupled between the third and fourth pairs of switches such that at least one switch of the third and fourth pairs of switches is coupled between each lead of the differential output of the motor driver and the output of the first stage or the ground of the motor driver.

18. The method of claim 17, further comprising:

generating, by the first stage of the motor driver, a rectified sine wave at the output of the first stage; and converting, by the second stage of the motor driver, the rectified sine wave at the output of the first stage into a full sine wave generated at the differential output of the motor driver, wherein the drive signals generated by the motor driver comprise the full sine wave generated by the second stage of the motor driver.

19. The method of claim 12, wherein:

the motor driver comprises a capacitor coupled to the output of the first stage of the motor driver; and the capacitor and the inductor are configured to form a low pass filter integrated with the first stage of the motor driver and configured to low pass filter signals generated by the first stage of the motor driver.

20. The method of claim 12, further comprising cooling an electronic device thermally coupled to the cryocooler controlled by the cryocooler controller, wherein:

the motor of the cryocooler controlled by the cryocooler controller comprises a linear motor driven by the drive signals generated by the motor driver of the cryocooler controller; and the electronic device comprises at least a part of a sensor system or an infrared camera.

* * * * *